(12) United States Patent
Rios, Jr.

(10) Patent No.: US 12,431,041 B2
(45) Date of Patent: Sep. 30, 2025

(54) DISPLAY BARS AND DISPLAY BAR ASSEMBLIES FOR SUPPORTING DISPLAY OBJECTS

(71) Applicant: Eleazar Rios, Jr., Alvin, TX (US)

(72) Inventor: Eleazar Rios, Jr., Alvin, TX (US)

(73) Assignee: SignWay Corp, Alvin, TX (US)

( * ) Notice: Subject to any disclaimer, the term of this patent is extended or adjusted under 35 U.S.C. 154(b) by 417 days.

(21) Appl. No.: 17/985,835

(22) Filed: Nov. 12, 2022

(65) Prior Publication Data

US 2023/0177981 A1    Jun. 8, 2023

Related U.S. Application Data

(63) Continuation-in-part of application No. 17/209,413, filed on Mar. 23, 2021, now Pat. No. 11,688,306.

(51) Int. Cl.
*G09F 7/18* (2006.01)
*F16M 11/26* (2006.01)

(52) U.S. Cl.
CPC .............. *G09F 7/18* (2013.01); *F16M 11/26* (2013.01); *G09F 2007/1834* (2013.01); *G09F 2007/1852* (2013.01)

(58) Field of Classification Search
CPC .............. G09F 7/18; G09F 2007/1834; G09F 2007/1852; F16M 11/26
See application file for complete search history.

(56) References Cited

U.S. PATENT DOCUMENTS

| | | | | |
|---|---|---|---|---|
| 953,871 | A * | 4/1910 | Turner | G09F 7/18 40/607.05 |
| 1,327,427 | A * | 1/1920 | Foster | G09F 15/0006 40/606.03 |
| 1,421,603 | A * | 7/1922 | Stanton | E01F 9/623 40/607.03 |
| 2,187,974 | A * | 1/1940 | Johnson | A47J 31/44 248/314 |
| 2,636,300 | A * | 4/1953 | Suckle | G09F 7/08 40/607.05 |
| 3,820,906 | A * | 6/1974 | Katt | F16B 7/0426 403/312 |
| 4,757,967 | A * | 7/1988 | Delmore | H02G 3/126 248/27.1 |

(Continued)

*Primary Examiner* — David R Dunn
*Assistant Examiner* — Christopher E Veraa
(74) *Attorney, Agent, or Firm* — Jeffrey L. Streets

(57) ABSTRACT

An apparatus includes first and second display bars, each display bar having a rectangular cross-section, each display bar having a plurality of first through holes each having a first diameter for receiving a first tubular support therethrough, and each display bar having a plurality of second through holes each having a second diameter for receiving a fastener; a first upright tubular support receivable through one of the first through holes in the first display bar for vertically supporting the first display bar; a second upright tubular support receivable through one of the first through holes in the second display bar for vertically supporting the second display bar; and a fastener secured through one of the second through holes in the first display bar and one of the second through holes in the second display bar to secure the first and second display bars together.

19 Claims, 16 Drawing Sheets

(56) References Cited

U.S. PATENT DOCUMENTS

| | | | | |
|---|---|---|---|---|
| 4,926,592 A * | 5/1990 | Nehls | E01F 9/685 | 40/607.05 |
| 5,190,214 A * | 3/1993 | Dewailly | A47G 29/1216 | 239/323 |
| 5,836,130 A * | 11/1998 | Unruh | F16L 3/223 | 52/712 |
| 6,097,608 A * | 8/2000 | Berberich | G11B 25/043 | 361/752 |
| 6,279,822 B1 * | 8/2001 | Bertram | A47F 3/004 | 312/211 |
| 6,419,511 B2 * | 7/2002 | Lizell | A47B 21/06 | 439/210 |
| 6,807,782 B2 * | 10/2004 | Forman | E04F 19/00 | 40/607.1 |
| 7,673,841 B2 * | 3/2010 | Wronski | F21S 8/026 | 248/200.1 |
| 7,797,869 B2 * | 9/2010 | Tollis | G09F 15/0037 | 40/607.04 |
| 8,011,160 B2 * | 9/2011 | Rice | E04B 2/763 | 52/712 |
| 8,148,635 B1 * | 4/2012 | Gretz | H02G 3/123 | 174/53 |
| 8,267,366 B2 * | 9/2012 | Cheng | F16M 11/046 | 248/295.11 |
| 8,353,068 B1 * | 1/2013 | Bailey | A47K 17/022 | 16/446 |
| 8,975,519 B2 * | 3/2015 | Lalancette | H05K 5/0204 | 248/300 |
| 8,979,043 B2 * | 3/2015 | Florman | B23P 19/00 | 248/248 |
| 10,122,157 B1 * | 11/2018 | Gintz | H02G 3/0437 | |
| 10,737,865 B1 * | 8/2020 | Sooklaris | B44D 3/00 | |
| 11,087,645 B1 * | 8/2021 | Hockett | G09F 21/048 | |
| 11,501,666 B1 * | 11/2022 | Marston | G09F 15/0006 | |
| 11,688,306 B2 * | 6/2023 | Rios, Jr. | G09F 15/0062 | 40/607.05 |
| 2002/0121070 A1 * | 9/2002 | Hurlock | E04F 21/185 | 52/749.11 |
| 2004/0134110 A1 * | 7/2004 | Konny | G09F 15/0037 | 40/607.03 |
| 2005/0050783 A1 * | 3/2005 | Wichmann | G09F 7/18 | 40/606.14 |
| 2009/0084919 A1 * | 4/2009 | Hillstrom | F16B 12/42 | 40/606.01 |
| 2010/0192434 A1 * | 8/2010 | Smith | G09F 7/18 | 40/606.01 |
| 2011/0271571 A1 * | 11/2011 | Lennard | G09F 15/0037 | 248/316.1 |
| 2012/0049036 A1 * | 3/2012 | Colesanti | G09F 7/18 | 248/508 |
| 2012/0318936 A1 * | 12/2012 | Lutz | A47G 7/041 | 248/121 |
| 2014/0353269 A1 * | 12/2014 | Trinh | A47F 5/0807 | 211/183 |
| 2015/0076312 A1 * | 3/2015 | Angvall | F16M 11/046 | 211/162 |
| 2022/0309962 A1 * | 9/2022 | Rios, Jr. | G09F 15/0037 | |
| 2023/0177981 A1 * | 6/2023 | Rios, Jr. | G09F 19/22 | 40/607.04 |
| 2023/0341081 A1 * | 10/2023 | Eduarde | A01K 5/0114 | |

\* cited by examiner

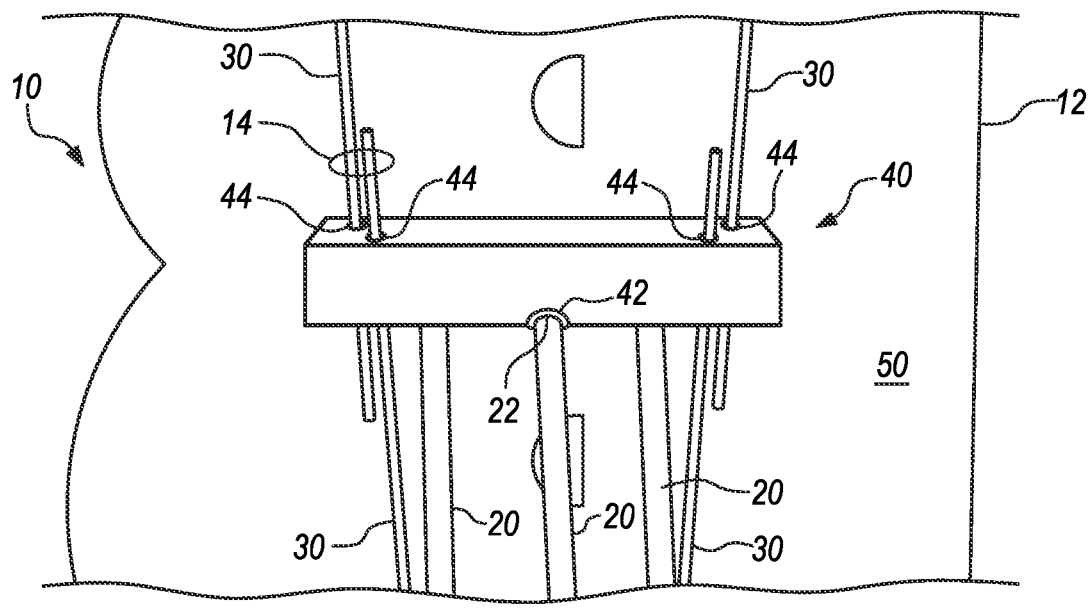
FIG. 2
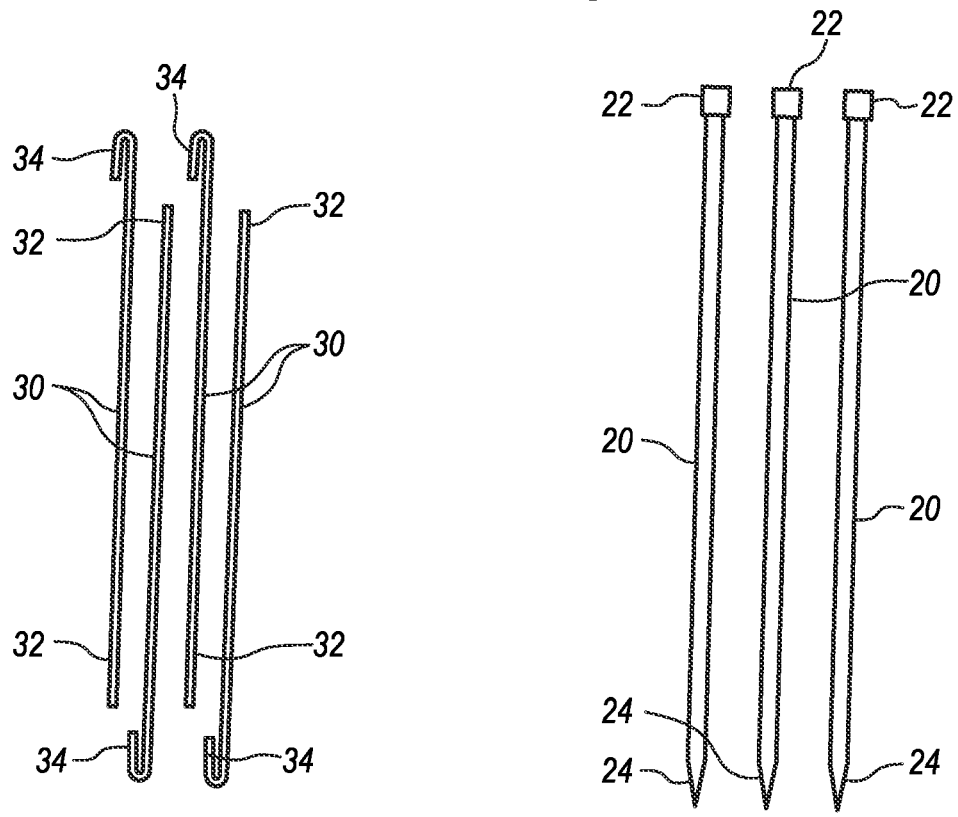
FIG. 3          FIG. 4

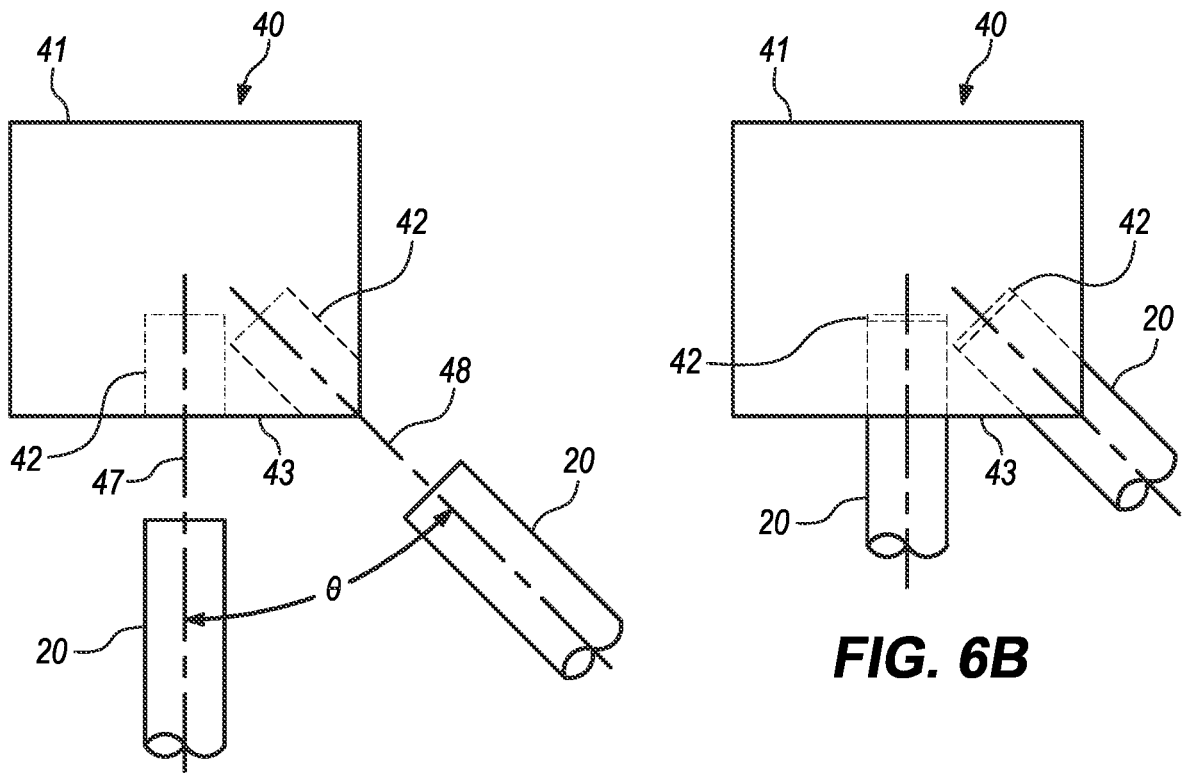
FIG. 6A
FIG. 6B
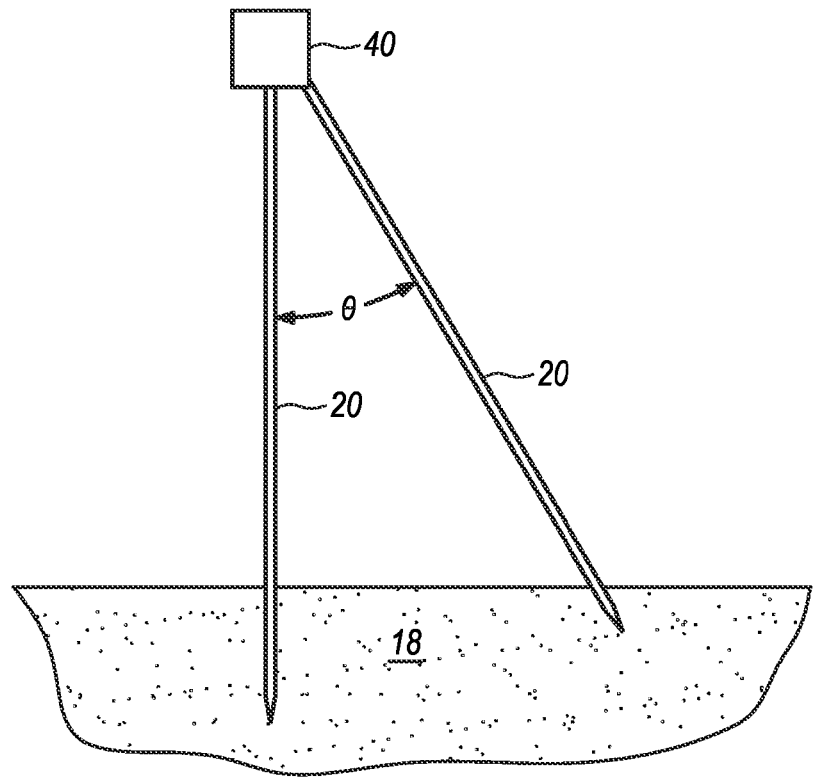
FIG. 6C

DISPLAY BARS AND DISPLAY BAR ASSEMBLIES FOR SUPPORTING DISPLAY OBJECTS

CROSS-REFERENCE TO RELATED APPLICATIONS

This application is continuation-in-part of U.S. Non-Provisional patent application Ser. No. 17/209,413 filed on Mar. 23, 2021, which application is incorporated by reference herein.

BACKGROUND

The present disclosure relates to a display easel for supporting a display object.

Background of the Related Art

Signs and other objects may be displayed in a wide variety of ways. However, it can be helpful or useful to elevate the sign or object so that it can be seen better. For example, an object may be set on a pedestal or a sign may be bolted to a post. Some known manners of displaying a sign or other object may be heavy or cumbersome to move, may require use of tools, may fall apart during use, and/or may include expensive components. Furthermore, the manner of displaying a sign or object should not detract attention from the sign or object itself.

BRIEF SUMMARY

Some embodiments provide an apparatus comprising: first and second display bars, each display bar having a rectangular cross-section, each display bar having a plurality of first through holes each having a first diameter for receiving a first tubular support therethrough, and each display bar having a plurality of second through holes each having a second diameter for receiving a fastener; a first upright tubular support receivable through one of the first through holes in the first display bar for vertically supporting the first display bar; a second upright tubular support receivable through one of the first through holes in the second display bar for vertically supporting the second display bar; and a fastener secured through one of the second through holes in the first display bar and one of the second through holes in the second display bar to secure the first and second display bars together.

Some embodiments provide a kit comprising: first and second display bars, each display bar having a rectangular cross-section, each display bar having a plurality of first through holes each having a first diameter for receiving a first tubular support therethrough, and each display bar having a plurality of second through holes each having a second diameter for receiving a fastener; wherein each display bar has a first face, a second face opposite the first face, a first edge extending between the first face and the second face, and a second edge opposite the first edge and extending between the first face and the second face, and wherein each of the through holes extend through the display bar from the first face to the second face.

BRIEF DESCRIPTION OF THE SEVERAL VIEWS OF THE DRAWINGS

FIG. 2 is a perspective view of a rigid member in the form of a block for securing a set of support legs and a set of retainer arms.

FIG. 3 is a plan view of a set of retainer arms.

FIG. 4 is a plan view of a set of support legs.

FIGS. 6A-6B are schematic diagrams illustrating formation of a connection between support legs and the block.

FIG. 6C is a schematic diagram illustrating the support legs forming stakes that are pushed into soil to support the display easel.

DETAILED DESCRIPTION

Figure 1A:
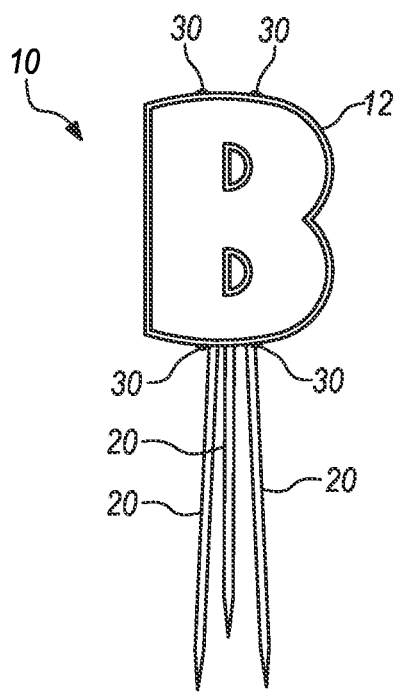
FIGS. 1A-1D include front, back, top and side views of a display easel displaying a sign in the shape of the letter "B".

Some embodiments provide an apparatus that includes a support member forming a plurality of seats, wherein each seat is adapted to secure an upper end of a yard stake, wherein the support member is further adapted to support at least two retainer arms, and wherein each retainer arm has a distal end including a hook adapted to secure an edge of a display object. The apparatus may be used to assembly a display easel, such as may be used to display a yard sign.

In some embodiments, the support member is a block. The block may be made from wood, plastic, metal, rubber or other materials, and may be either formed by molding or through a subtractive fabrication process. For example, some features of the block may be fabricated by drilling and/or cutting. In one option, each seat is a blind hole extending into the block, which may be formed by drilling partially through the block.

In some embodiments, the apparatus may include the two retainer arms. Optionally, the block may include a plurality of through holes so that each retainer arm may be slidably extendable into a selected one of the through holes and frictionally engageable with an inside surface of the selected one of the through holes. Each retainer arm may be made of metal and/or plastic, such as a 9-gauge steel wire.

In some embodiments, the apparatus may be used to assembly a display easel and the display object may include a fluted plastic sheet. Accordingly, the hook of each retainer arm may be adapted to be inserted into an open end of a flute in the fluted plastic sheet. Decorative designs and information may be printed on the fluted plastic sheet, such that the display object servers as a yard sign or other indoor or outdoor sign.

In some embodiments, the support member is a bracket formed by a wire and each seat is formed by a loop in the wire. The bracket is sufficiently rigid to hold its shape, but may have some flexibility to adjust to slight dimensional variations in the yard stakes or display object. Furthermore, the retainer arms may include a first retainer arm formed by a first end of the wire and a second retainer arm formed by a second end of the wire.

The yard stakes may be any form of leg, support, or post that is able to support the support member, whether the support member is a rigid block or a wire bracket. Some types of yard stakes may also be referred to as garden stakes or tomato stakes. The yard stakes may be made with metals, plastics, wood, bamboo, or various composites. One example of a suitable yard stake is a plastic-coated steel stake, which may have a diameter of less than 0.75 inch or less than 0.5 inch. Optionally, the stake may be textured to improve gripping.

Some embodiments provide a kit for forming a display easel. The kit may include all of the components necessary to form the display easel or may include only certain of the necessary components. For example, the yard stakes may be a standard commercially available yard stake that an end user may source from a third-party retailer for use along with a kit that includes all of the other components necessary to form the display easel.

In some embodiments, a kit includes a rigid block having a plurality of first holes and a plurality of second holes that are smaller in diameter than the plurality of first holes. The kit may further include a plurality of wire retainer arms, wherein each wire retainer arm has a first end for securing to the rigid block and a second end forming a wire hook. The wire hook may be configured to support a display object and each of the plurality of first holes may be positioned and adapted for securing an upper end of a yard stake.

In some embodiments, the wire hook formed on the second end of each wire retainer arm may have a distal end that is configured for insertion into a flute of a corrugated plastic sheet forming at least a portion of the display object. For example, the distal end may be straight to facilitate insertion into a straight flute. In one option, the straight distal end of the wire hook may have a length ranging from about 0.5 inches to about 3 inches. Furthermore, the first end of each retainer wire may be straight and extendable into and through any of a plurality of through holes in the rigid block from either the upper or lower surface.

In some embodiments, each of the second holes is a through hole that extends through the rigid block from an upper surface to a lower surface. Accordingly, for each of the wire retainer arms, the first end of the wire retainer arm may be inserted into one of the second holes and the wire hook on the second end of the wire retainer arm may be inserted into a flute of a corrugated plastic sheet forming at least a portion of the display object to cause a lateral flexing in the wire retainer arm that presses against an inside surface of the second hole with sufficient force so that friction secures the display object at a variable elevation relative to the rigid block.

In some embodiments, each of the first holes is a blind hole that extends upward into the rigid block. The blind holes may each have an axial centerline, whether the blind hole has a circular or polygonal cross-sectional shape. The axial centerlines of the blind holes may be parallel, but at least one of the blind holes will preferably have an axial centerline that forms an acute angle with the axial centerline of at least one other of the blind holes. In one example, the rigid block has at least three blind holes including at least one blind hole having an axial centerline that forms an acute angle relative to the axial centerlines of the other blind holes. As a result, the yard stakes that are secured in the blind holes will be directed downward to extend in the direction of the axial centerlines of the respective blind holes, and the at least one blind hole will secure a yard stake that is directed rearward to form a tripod with a base that is broader than the block itself. Securing at least three yard stakes in the rigid block provides a broad and stable base with substantial support for the rigid block and any sign supported by the display easel against wind or other forces.

In some embodiments, the plurality of first holes is located in a central portion of the rigid block (i.e., central between a left end and a right end), and the plurality of second holes include at least one second hole located in a first lateral portion of the rigid block and at least one second hole located in a second lateral portion of the rigid block. However, the first and second holes may be located in any position in the rigid block, including interspersed or overlapping from left to right or from front to back.

In some embodiments, the kit may further include a plurality of yard stakes, each yard stake having an upper end that is securable in one of the first holes. It should be understood that each yard stake may be selectively securable in one of the first holes and subsequently may be selectively detachable from the one of the first holes. In fact, the yard stakes may be secured any number of times as necessary to support a display object and detaches any number of times to facilitate compact transportation and/or storage. However, it is also an option to secure the yard stakes to the rigid block and keep them secured.

In some embodiments, the kit may further include a corrugated plastic sheet that forms at least a portion of the display object. The hook formed on the second end of each wire retainer arm may have a distal end that is configured for insertion into a flute of the corrugated plastic sheet.

Some embodiments provide an apparatus for forming a display easel that includes a wire bracket. The wire bracket may have a first end forming a first upwardly-directed hook, a second end forming a second upwardly-directed hook, and a plurality of loops formed between the first end and second end. The first and second upwardly-directed hooks are adapted for supporting a display object. Each of the loops has a central opening for securely receiving an upper end of a yard stake and directing the yard stakes in a downward direction.

In some embodiments, the wire bracket may be made with a single piece of 9-gauge wire. The single piece of wire may be prepared from a straight or coiled wire by performing a series of bends. The wire bracket may include straight segments and/or curved segments between the hooks and the loops. Each loop may include one or more turns of the wires, such that the wire extends at least 360 degrees around an axial centerline. Each loop preferably includes from 1 to 3 turns of the wire.

In some embodiments, the wire bracket extends downwardly in a first region of the wire bracket between the plurality of loops and the first upwardly-directed hook, and wherein the wire bracket extends downwardly in a second region of the wire bracket between the plurality of loops and the second upwardly-directed hook. For example, a flat display object or a single wall of a corrugated plastic sheet may be received between the downwardly-directed region and the upwardly-directed hook, with the upwardly-directed hook received within a flute of the corrugated plastic sheet.

In some embodiments, the apparatus may further include a plurality of yard stakes. Each of the yard stakes may have an upper end that is securable in one of the plurality of loops. The lower end of each yard stake may be adapted for pushing into soil, such as with a pointed tip.

In some embodiments, the apparatus may further include a corrugated plastic sheet that forms at least a portion of a display object. The first and second upwardly-directed hooks may each have a distal end that is configured for insertion into a separate one of the flutes of the corrugated plastic sheet.

In some embodiments, the easel may be used to secure and/or support a display object with the hooks of the wire extending over a front edge of the display object. For example, if the display object is a wood board or stretched canvas panel, the hooks may extend around from the back of the display object to the front of at least a portion of the display object to prevent the display object from moving forward and backward.

Some of the embodiments may be very lightweight, may be assembled quickly without the use of tools, may stand up outside under windy conditions, and/or may be made with inexpensive components. Furthermore, the display easel may be substantially hidden behind the sign or object being displayed so as not to detract from the visibility or aesthetic appeal of the sign or object.

Some of the embodiments may be used to display a sign in a multi-sign display. For example, a plurality of the display easels may secure a first set or row of signs or object at a first elevation above a second set or row of signs or objects at ground level. Accordingly, the display easels expand the range and type of displays that may be designed and accomplished.

Examples of Materials

Rigid Block

The rigid block may be made from a variety of materials, such as wood, plastic, rubber, metal, combinations of materials, or composites. Furthermore, the through holes and blind holes may be formed by drilling into the block, or the block may be formed with the holes via injection molding or other manufacturing process. In one example, the rigid block may be a wooden block with the holes drill into the block.

The rigid block may have any shape and dimensions that will accommodate the plurality of through holes and the plurality of blind holes and provide sufficient material to have structural integrity. For example, the rigid block may be a rectangular cuboid, although there is no general requirement of precise dimensions or tolerances. Furthermore, the rigid block should not be so large as to be difficult to conceal behind the display object, which may have one or more openings therethrough or may be narrow.

The rigid block may have more through holes and/or more blind holes than will be used at any one time in order to provide optional placement of the wires and/or the easel legs.

Wire

The wire may be characterized as mostly rigid, but will preferably bend or flex a few degrees, without any permanent deformation, over its length when subjected to an external manual force directed perpendicular to a longitudinal axis of the wire. A non-limiting example of a suitable wire is a 9-gauge steel wire. The wire may be textured or smooth, and may be bare or coated. In some embodiments, the wire may be galvanized to form a protective zinc coating over a steel or iron wire. Furthermore, the wire is not limited to metals, but may include plastics and other composites. Similarly, the wire may have any a variety of cross-sectional shapes, such as round or square.

The wire is preferably straight from the first end along a substantial portion of the length of the wire and may terminate with a hook at the opposing second end of the wire. The hook may be a J-hook with either a rounded or squared shaped bend forming the hook. One hook may include a 180-degree bend in the wire and form a short straight end of the hook that may run parallel to the long straight portion of the wire. The hook gap (i.e., distance between the point and the shank) may be as narrow as the portion of the display object that must be secured. In one non-limiting example, the hook gap may be about $\frac{1}{16}^{th}$ to extend over one flat layer of a 4 mm fluted plastic sheet so that the point of the hook may be inserted into one of the flutes. In another non-limiting example, the hook gap may be about ½ inch to extend over the edge of the entire 4 mm fluted plastic sheet, ¼-inch plywood, or a foamboard. It should be recognized that the size and shape of the hooks may be customized to be complementary to the physical shape of the display object that is to be secured by the hooks.

A metal wire, such as a 9-gauge steel wire, may be cut to a desired length and then one end of the wire may be bent to form the hook. The hook may be formed with a bending tool, such as a table mounted wire bending jig or handheld metal forming pliers. Alternatively, a plastic wire may be formed from a plastic rod that is heated at one end to facilitate shaping into a hook, or may be form by injection molding to simultaneously form the straight portion and the hook.

Display Bar

The display bar may be made from a variety of materials, such as wood, plastic, rubber, metal, combinations of materials, or composites. Furthermore, the through holes may be formed by drilling into the block, or the block may be formed with the holes via injection molding or other manufacturing process. In one example, the display bar may be a plastic (polymeric) block with the holes drill into the block.

The display bar may have any elongate shape and dimensions that will accommodate the plurality of through holes and provide sufficient material to have structural integrity. For example, the display bar may have a rectangular cross-section, although there is no general requirement of precise dimensions or tolerances. Furthermore, the display bar should not be so large as to be difficult to conceal behind the display object, which may have one or more openings therethrough or may be narrow. However, the length of a display bar assembly may be extended by coupling multiple display bars together end-to-end.

The display bar may have more through holes and channels than will be used at any one time in order to provide optional placement of the wires, easel legs, and mounting clips. In this manner, a standard set of the display bars, easel legs, wire retainer arms and mounting clips may be used to support a wide variety of sign sizes, shapes and arrangements.

Easel Legs

The easel legs are preferably long and slender structural components that elevate the rigid block and support the weight of the display object. Furthermore, the easel legs may have sufficient strength and rigidity to support the display object and resist blowing over in the wind. For example, the easel legs may be made of wood, plastic, bamboo, metal and composite materials. Furthermore, the easel legs may include rods, poles, or more complex structures.

In some embodiments, the easel legs may be a metal stakes, such as a yard, garden, tomato, or landscape stakes, that may be pushed firmly into the soil. One preferred stake is a plastic-coated steel stake. Non-limiting examples of a suitable steel stake may be 2 to 6 feet in length and 0.25 to 0.75 inch in diameter.

In some embodiments, the easel legs may include an upright tubular pole, optionally supported by a stand having lateral support for resting on a floor or ground surface. The upright tubular pole may be rigid or may be formed in sections, such as a telescoping pole that may be collapsed for transport and extended to a desired length (height) for a given implementation.

Display Object

The display object may be any item that can be secured to the display easel. More specifically, the display object may be any item that can be secured by the hooks at the second ends of the wires. While many embodiments are described in reference to a display object including a fluted plastic board or sheet, the display object may be many other items, materials and shapes. For example, the display object could be a plywood sheet, particle board, cardboard, stretched canvas panel, foamboard, plastic panels, and composites. Furthermore, the display object may be flat, but may also have other shapes and dimensions.

A fluted plastic board or sheet typically may, without limitation, have two flat layers that are separated by a ribbed center layer. Together, the flat and ribbed layers form flutes (openings) therebetween. The term "flute" or "fluted" refers to the long and slender openings that extend through the sheet from one edge to another edge. The flutes are typically straight and parallel. A fluted plastic sheet may be formed an extrusion process, such that the ribs in the ribbed layer may be perpendicular or angled relative to the flat layers. Depending upon the die used in the extrusion process, the flutes may have any of a wide variety of cross-sectional shapes, including squares, rectangles, triangles, or curves.

A fluted plastic board or sheet may also be commonly referred to as twin wall plastic or as corrugated plastic board or sheet. While the fluted plastic board or sheet may or may not be formed with a corrugated center layer, it is still common to refer to an extruded fluted plastic board or sheet as being a corrugated plastic board or sheet since the end of the sheet resembles a corrugated fiberboard or cardboard.

A fluted plastic sheet may made of polypropylene (PP) or polyethylene (PE), which are commonly used thermoplastics. For example, polypropylene is resistant to many chemicals at normal temperatures and can be dosed with additives to provide a variety of physical properties, such as ultraviolet (UV) light resistance, anti-static resistance and fire resistance. Furthermore, polypropylene is recyclable under resin identification code 5. Polycarbonate (PC), polyvinylchloride (PVC) and polyethylene terephthalate (PET) may also be used to make a corrugated plastic sheet, but these materials are less preferred than polypropylene and polyethylene. A fluted plastic sheet is typically light-weight, tough and waterproof, yet can be easily cut with a utility knife. Fluted plastic boards or sheets are available in various grades including general purpose, digital, archival, utility, packaging, and fire retardant.

A corrugated plastic sheet may be manufactured by forming a molten plastic and pushing the molten plastic through a die that provides the profile. Dies are typical 1-3 meters wide, delivering a product of thickness up to 25 mm. Manufacturers typically offer a wide variety of colors and thicknesses (quite commonly 4, 6, 10 mm). For making yard signs and similar applications, it is common to use a 4 millimeter corrugated plastic sheet.

Foam board, also referred to as foamcore, is a lightweight and easily cut material including a board of polystyrene foam clad with an outer layer of paper or plastic.

Example Embodiment—Rigid Block

In one example, the rigid member is a wooden block having dimensions of about 1.25 inches (Width)×1.25 inches (Height)×6 inches (Length). Some kits may include alternative blocks, such as a second block having dimensions of about 1.25 inches (Width)×1.25 inches (Height)×4 inches (Length). The diameter of the 2-3 blind-holes may be about 0.5 inches and may be about 0.5 to 1 inch deep for receiving 2-3 garden stakes made from steel tubing and a plastic coating or sleeve available under the tradename Vigoro Sturdy Stake. Any length of garden stake may be used, but the commonly available lengths include 4 feet, 5 feet and/or 6 feet. The diameter of the 2-8 through-holes is about 3/16 inch for receiving 2-4 retainer arms made from 9-gauge steel wire (diameter of about 9/64 inch) available from Redbrand.

Example Embodiment—Rigid Wire

In one example, the rigid member is a wire bracket that is bent to form 2-3 loops and has two ends that are bent to form a pair of hooks. The 2-3 loops may each have a diameter that is suitable to secure the end of a garden stake made from steel tubing and a plastic coating or sleeve available under the tradename Vigoro Sturdy Stake. Any length of garden stake may be used, but the commonly available lengths include 4 feet, 5 feet and/or 6 feet. The wire bracket may be formed by bending a 9-gauge steel wire (diameter of about 9/64 inch) available from Redbrand. Each loop may include one or more passes of the wire as desired to adequately secure the end of the garden stake.

FIGS. 1A-1D include front, back, top and side views of a display easel 10 displaying a sign 12 in the shape of the letter "B". In reference to FIG. 1A, the front of the sign 12 is displayed. All that can be seen of the display easel 10 is three legs in the form of yard stakes 20 extending below the sign 12 and a small bent portion of four retainer arms 30 along the outer edge of the sign 12. In this embodiment, there is no element of the display easel 10 that blocks the view of even the outer edge of the sign 12.

Figure 1B:
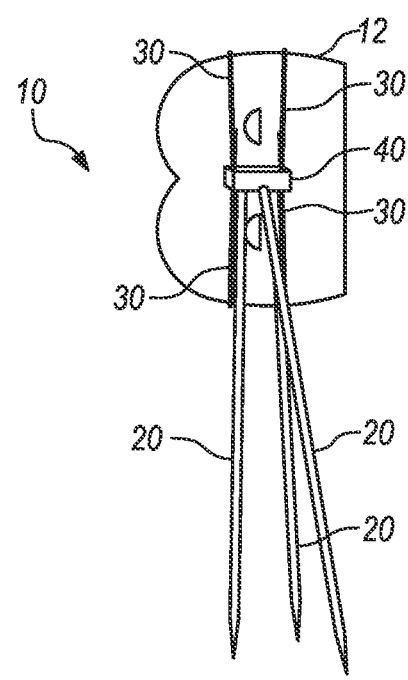

FIG. 1B is a back view of the display easel 10 of FIG. 1A. The back view shows a rigid block 40 that secures an upper end of each of the yard stakes 20. Furthermore, the rigid block 40 secures each of the four retainer arms 30 that couple the sign 12 to the rigid block 40. Details of the connections between the rigid block 40 and both the yard stakes 20 and the retainer arms 30 is provide in reference to additional figures below.

Figure 1C:
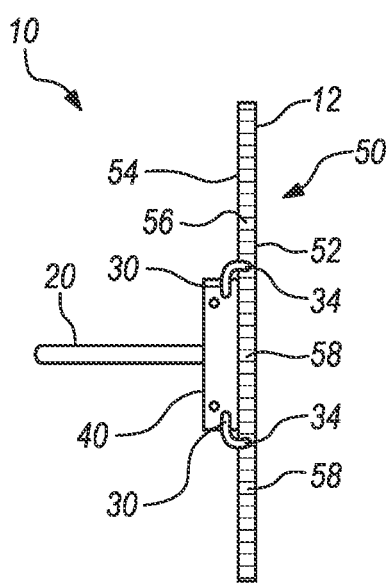

FIG. 1C is a top view of the display easel 10. The sign 12 is shown to be a corrugated plastic sheet 50 having a front wall 52, a back wall 54, and numerous ribs 56 extending between the front and back walls 52, 54 to collectively form the open flutes 58 that extend in parallel from the top to the bottom of the corrugated plastic sheet 50 (i.e., in and out of the page as shown in FIG. 1C).

In this top view, the rigid block 40 is shown flush with the back of the sign 12. One yard stake 20 is shown extending rearward (and downward) from the rigid block 40 and two of the retainer arms 30 can be seen extending over an edge of the back wall 54 of the corrugated plastic sheet 50 before the hook of each retainer arm 30 extends into one of the flutes 58 of the sheet 50.

Figure 1D:
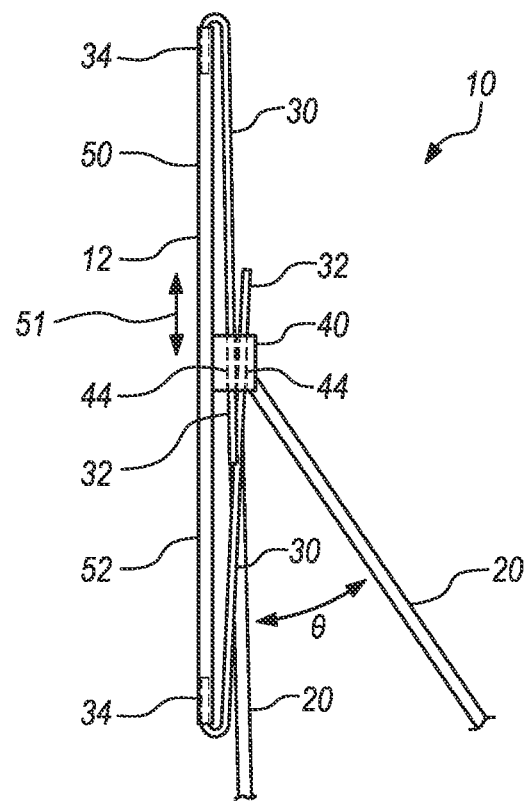

FIG. 1D is a side view of the display easel 10. An upper end of the yard stakes 20 are secured to the rigid block 40 and extend downward (i.e., toward the ground). A first one of the yard stakes 20 is extending straight down, directly below the rigid block 40 and a second one of the yard stakes 20 is downwardly and rearwardly directed at an acute angle ("Θ") relative to the first yard stake. A third yard stake 20 (not shown; but see FIGS. 1A-1B) is located directly behind the first yard stake and is hidden from view. Alternatively, a yard stake could be downwardly and rearward directed as the second yard stake 20, and could be hidden from view. Accordingly, the rigid block 40 is supported by the yard stakes 20 in an elevated position above the ground.

The rigid block 40 includes a set of holes 44 (shown in dashed lines) that are through holes extending from an upper surface of the rigid block 40 to a bottom surface of the rigid block 40. A straight end 32 of each retainer arm 30 is inserted into one of the holes 44 and a hook 34 formed as an opposite end of the retainer arm 30 has been inserted into a flute 58 (see FIG. 1C) of the corrugated plastic sheet 50 that forms the sign 12. While the rigid block 40 is supported in an elevated position by the yard stakes 20, the sign 12 is supported in front of the rigid block by the retainer arms 30. Furthermore, to the extend that the retainer arms 30 have sufficient length, the elevation of the sign 12 relative to the rigid block 40 may be easily and quickly adjusted upward and/or downward (as indicated by the dual-directed arrow 51) by sliding the retainer arms 30 upward or downward through the holes 44. Such a height adjustment is particularly beneficial when the sign 12 is part of a multi-sign display and some manner of vertical alignment is desired despite any irregularity in the underlying ground or other support surface.

FIG. 2 is a perspective view of the rigid block 40 for securing a set of three yard stakes 20 (or "support legs") and a set of four retainer arms 30. In one option, the display easel 10 may include just one or two of the three yard stakes 20 shown or may include additional yard stakes 20. In another option, the display easel 10 may include just one, two or three of the four retainer arms 30 shown, or may include additional retainer arms 30. Preferred embodiments of the display easel 10 include at least two yard stakes 20. In addition, preferred embodiments of the display easel 10 include at least two retainer arms 30. The at least two retainer arms 30 may both be inserted upward through the rigid block 40 so that the hooks 34 are below the rigid block 40 and extend upward into a bottom edge of the corrugated plastic sheet 50. Alternatively, the at least two retainer arms 30 may include a first retainer arm 30 inserted upward through the rigid block 40 so that the hook 34 is below the rigid block 40 and extends upward into a bottom edge of the corrugated plastic sheet 50 and a second retainer arm 30 inserted downward through the rigid block 40 so that the hook 34 is above the rigid block 40 and extends downward into an upper edge of the corrugated plastic sheet 50.

The upper end 22 (only one shown) of each yard stake 20 has been inserted into respective holes 42 (only one shown) in the rigid block 40. The connections may be a friction fit, which connection may be facilitated by twisting the yard stake 20 as the upper end 22 is pressed into the hole 42. A plastic or rubber coating on the yard stake 20 may improve the friction and grip between the rigid block 40 and the yard stake 20. Optionally, the upper end of the yard stakes 20 may have coarse screw threads with teeth that engage the inside walls of the hole 42, such that the twisting the yard stake will cause threaded engagement and advancement of the yard stake into the hole. The yard stakes 20 also have a lower end (not shown) that may be pushed into the ground.

The four retainer arms 30 are slidably received in the through holes 44. In one option, the four retainer arms 30 have a diameter that is a tight fit within the holes 44, such that a force is required to slide the retainer arms through the holes 44 regardless of any lateral flexing of the retainer arms. In another option, the four retainer arms 30 have a diameter that is slightly smaller than the inside diameter of the holes 44, such that the retainer arms can be easily inserted through the holes 44. In this latter option, the retainer arms 30 may be caused to forcibly engage an inside surface of the holes 44 by imparting a lateral flexing force on the retainer arms 30. This lateral flexing force may be imparted by inserting the hooks 34 in a flute of the sign 12 that is laterally offset from the hole 44. One manner of imparting this lateral flexing force is discussed further in reference to FIG. 7.

A beneficial feature of the embodiment of FIG. 2 is that a single end user may adjust the elevation of the sign 12 relative to the rigid block 40, which should be supported in a stationary elevation by the yard stake 20. While some adjustment in elevation may be achieved by adjusting the extent to which the yard stakes 20 are pushed into the ground, the elevation of the sign 12 may also be adjusted relative to the rigid block 40. This may be done by grabbing the retainer arms 30 at area 14 (perhaps with a left hand) and grabbing the retainer arms 30 at area 16 (perhaps with a right hand), then forcibly sliding the retainer arms 30 upward or downward through the holes 44. Due to the lateral flexing forces, the retainer arms will remain at the elevation where the end user stops the sliding.

FIG. 3 is a plan view of a set of retainer arms 30. The retainer arms are substantially straight along their length between a first end 32 and a second end forming a hook 34. The hook 34 is configured to support a display object, such as a sign or other object including a corrugated plastic sheet. For example, the hook 34 may include a bend an angle of about 180-degrees leaving only a narrow hook gap between the long straight shank portion of the retainer arm and the straight distal end of the hook. The retainer arms preferably have some flexibility, such as that found in a typical 9-gauge wire.

FIG. 4 is a plan view of a set of yard stakes 20. The yard stakes may be substantially straight between an upper end 22 and a lower end 24 that is optionally pointed to facility pushing into the soil or ground. The upper end 22 is illustrated with an enlarged diameter head, but no such head is required. The upper end 22 may include a plastic coating or other pliable material to improve gripping of the hole 42 into which the upper end 22 is inserted. A preferred yard stake has some lateral flexibility along its length, but is strong enough to support the weight of the rigid block, retainer arms and sign or other display object, as well as resist wind forces and/or other likely forces.

Figure 5A:
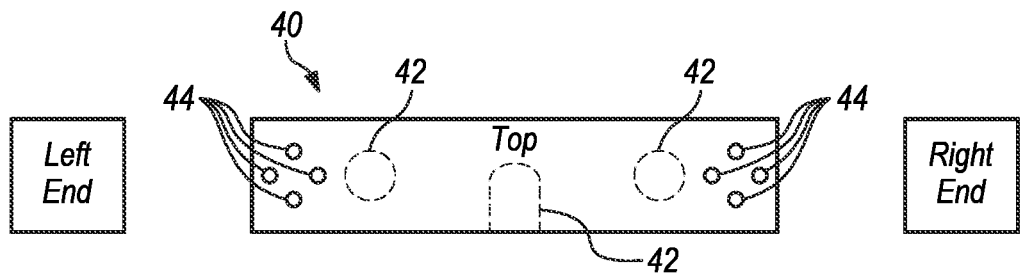
FIGS. 5A-5D include tope, back, bottom, and front views of the block.

FIGS. 5A-5D include top, back, bottom, and front views of the block. The top view of FIG. 5A illustrates a set of three first holes 42 (shown in dashed lines indicating they are hidden from view) for securing three yard stakes, a set of eight second holes 44 for securing at least two retainer arms. The number of first holes 42 and second holes 44 merely provides flexibility in the placement of yard stakes and retainer arms and does not imply that three yard stakes and eight retainer arms are required. For example, the rigid block 40 could be used with two yard stakes and two retainer arms, such that the end user may select with holes to use. In this embodiment, the left end and right end do not show any additional features.

Figure 5B:
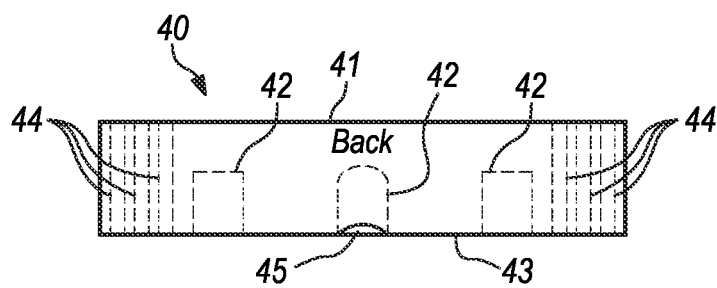
Figure 5C:
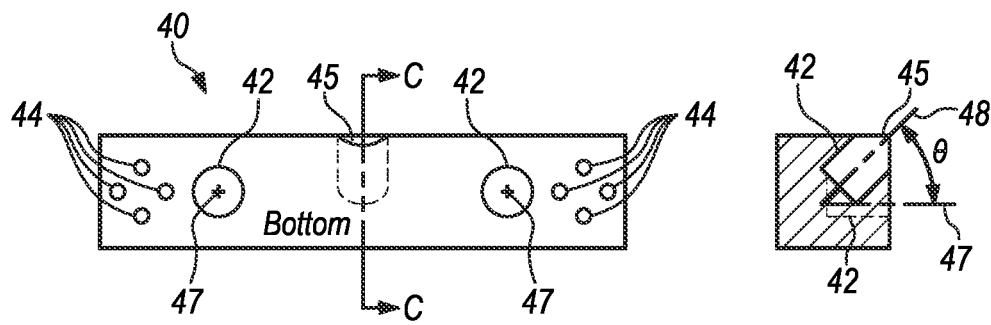

The back view of FIG. 5B illustrates the second holes 44 extending through the rigid block 40 from the top surface 41 (shown in FIG. 5A) to a bottom surface 43 shown in FIG. 5C. The first holes 42 are shown to be blind holes. A portion of the central hole 42 is shown at point 45, since this hole is formed in an edge of the rigid block.

The bottom view of FIG. 5C illustrates the openings of two of the first holes 42 with axial centerlines 47 and a portion of the central hole 42 is shown at point 45. To the right is a cross-section (as seen along line C-C) showing the central hole 42 and its axial centerline 47 forming an acute angle ("Θ") relative to the axial centerline of the other two holes 42.

Figure 5D:
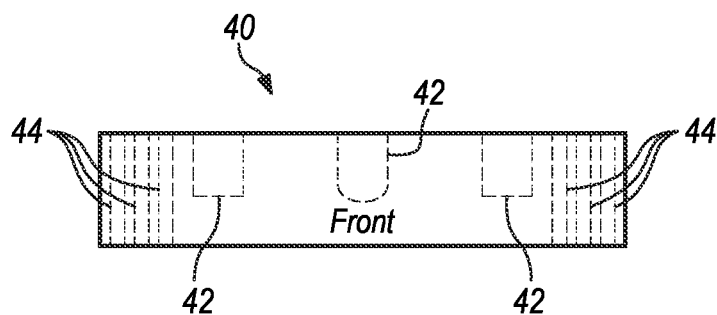

The front view of FIG. 5D illustrates the position of the features of the rigid block 40 that are hidden in this view, including the first holes 42 and the second holes 44.

FIGS. 6A-6B are schematic diagrams illustrating formation of a connection between yards stakes 20 and the rigid block 40. In FIG. 6A, the yard stakes 20 are aligned with the axial centerlines 47 of the first holes 42 in preparation for insertion into the holes 42. In FIG. 6B, the upper ends 22 of the yards stakes 20 have been securely received within the respective first holes 42. Notice that it may not be necessary for the upper ends 22 of the yards stakes 20 to reach the bottom of the first holes 42, so long as the connection is secure enough that the yard stakes 20 will not pull out under normal use of the display easel.

FIG. 6C is a schematic diagram illustrating the yard stakes 20 that are pushed into soil 18 to support the display easel (not fully shown; see FIG. 1B). Note the separation of the yard stakes 20 at roughly the same angle ("Θ") as exists between the central axis of the first holes as shown in FIGS. 6A-6B.

Figure 7:
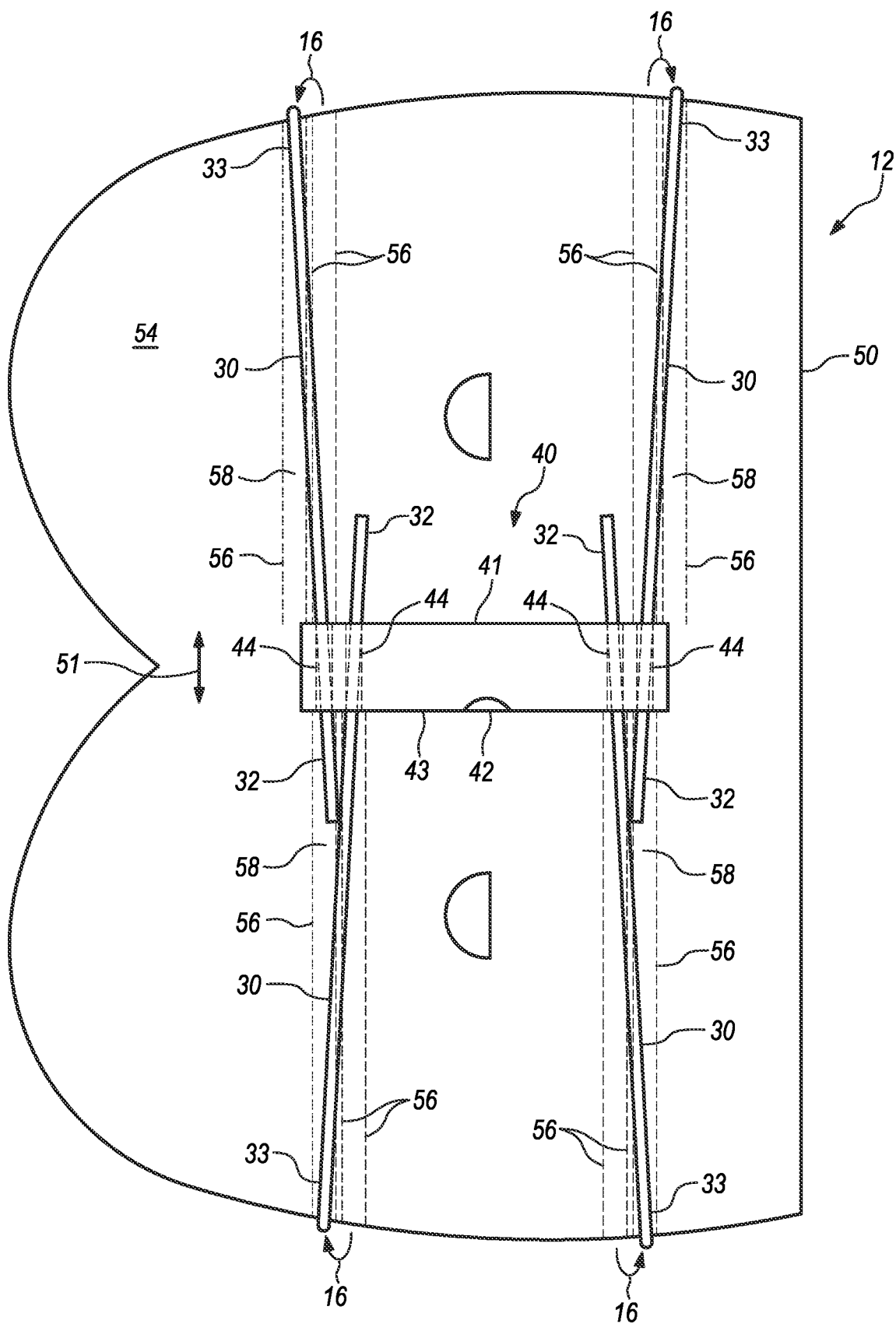
FIG. 7 is a back view of the block securing the sign with four retainer arms.

FIG. 7 is a back view of the rigid block 40 securing the sign 12 with four retainer arms 30. Each of the plurality of second holes 44 is a through hole that extends through the rigid block from the upper surface 41 to a lower surface 43. For each of the wire retainer arms 30, the first end 32 of the wire retainer arm 30 has been inserted into and through one of the second holes 44 and the wire hook (not shown; see hook 34 in FIGS. 1D and 3) on the second end 33 of the wire retainer arm 30 has been inserted into a flute 58 of the corrugated plastic sheet 50. As shown, the second end 33 was moved over at least one flute 58 (as indicated by the arrows 16) outward (i.e., away from each other) from a flute 58 that is aligned with the second hole 44 before inserting the hook into a flute 58. Accordingly, have the first end 32 secured in a second hole 44 and a second end 33 secured in a flute 58 that are not aligned will cause a lateral flexing in the wire retainer arm 30. This lateral flexing causes the retainer arm 30 to press against an inside surface of the second hole 44 with sufficient force to result in friction that secures retaining arms 30, and therefore the display object, at a variable elevation relative to the rigid block 40. Optionally, the retainer arms could be moved inwardly to cause the same lateral flexing. Optionally, each retainer arm may be laterally flexed in this manner in a random direction (left and/or right) since the rigid block is secured to the yard stakes (not shown; see FIGS. 1B and 2).

Figure 8A:
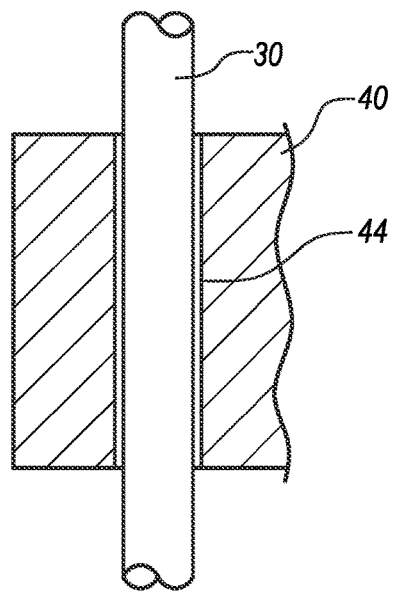
FIGS. 8A-8B are schematic cross-sectional diagrams of a retainer arm extending through a through-hole in the block.
Figure 8B:
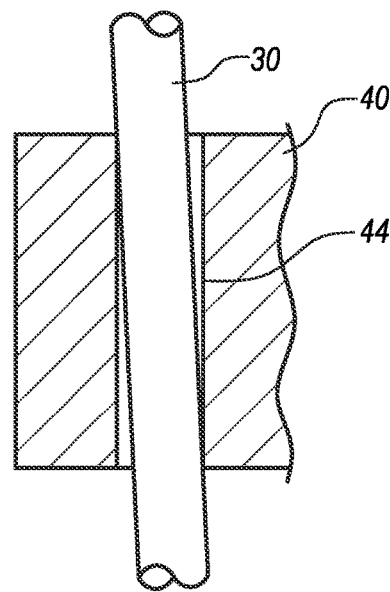

FIGS. 8A-8B are schematic cross-sectional diagrams of a retainer arm 30 extending through a through-hole 44 in the block 40. FIG. 8A illustrates the retainer arm 30 extending through the hole 44 without any lateral displacement and flexing of the retainer arm 30. FIG. 8B illustrates the retainer arm 30 extending through the hole 44 with lateral displacement of the retainer arm 30 (as shown in FIG. 7) causing the retainer arm 30 to press against the sidewall of the hole 44. This pressing causes a frictional engagement of the retainer arm 30 and the hole 44, such that the retainer arm 30 is secured to the rigid block 40 in a manner that can also support the weight of the sign or other display object. Still, it can be seen that there is nothing preventing an end user from sliding the retainer arm 30 through the hole 44 to adjust the elevation of a sign relative to the elevation of the rigid block 40. To make this adjustment, the amount of force applied by the end user must merely overcome the frictional forces that are otherwise holding the retainer arm in place.

Figure 8C:
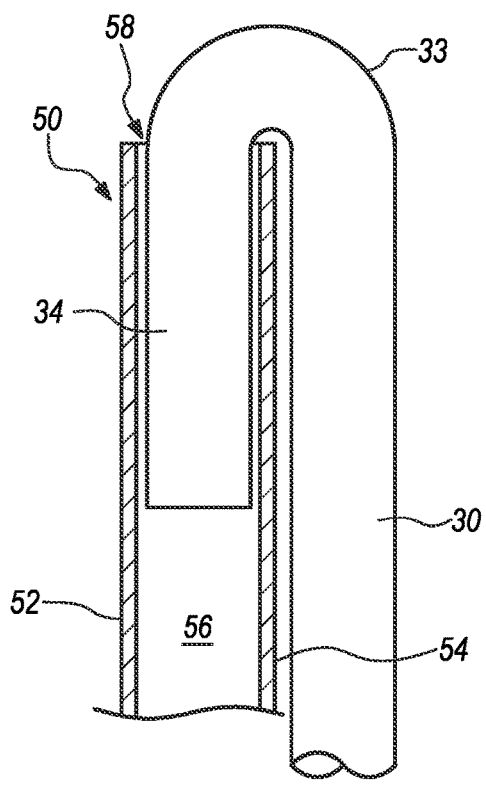
FIGS. 8C-8D are schematic cross-sectional diagrams of a retainer arm having a hook securing an edge of the sign or other display object.
Figure 8D:
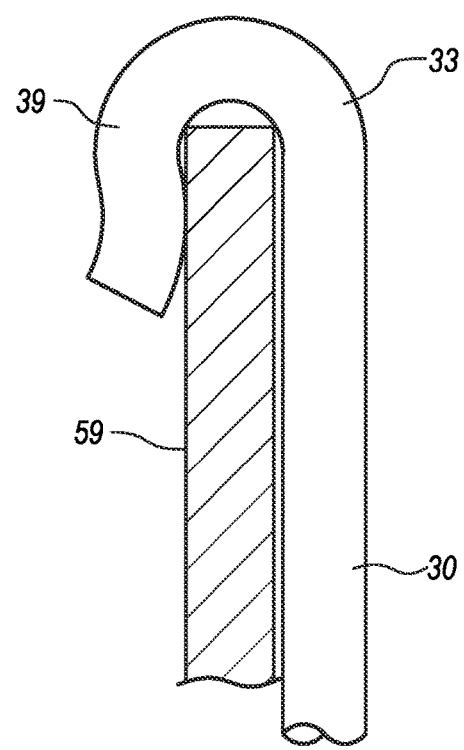

FIGS. 8C-8D are schematic cross-sectional diagrams of a retainer arm having a hook securing an edge of the sign or other display object. FIG. 8C shows a hook 34 at the distal end 33 of a retainer arm 30 that has been inserted into a flute 58 formed in a corrugated plastic sheet 50. The flute 58 is formed between the front wall 52, the back wall 54, and two adjacent ribs 56 (only one shown; see FIGS. 1C and 7). FIG. 8D shows a hook 39 at the distal end 33 of a retainer arm 30 that extend around an edge of a display object 59 to receive the display object between the hook 39 and the shank of the retainer arm that runs along the back.

Figure 9A:
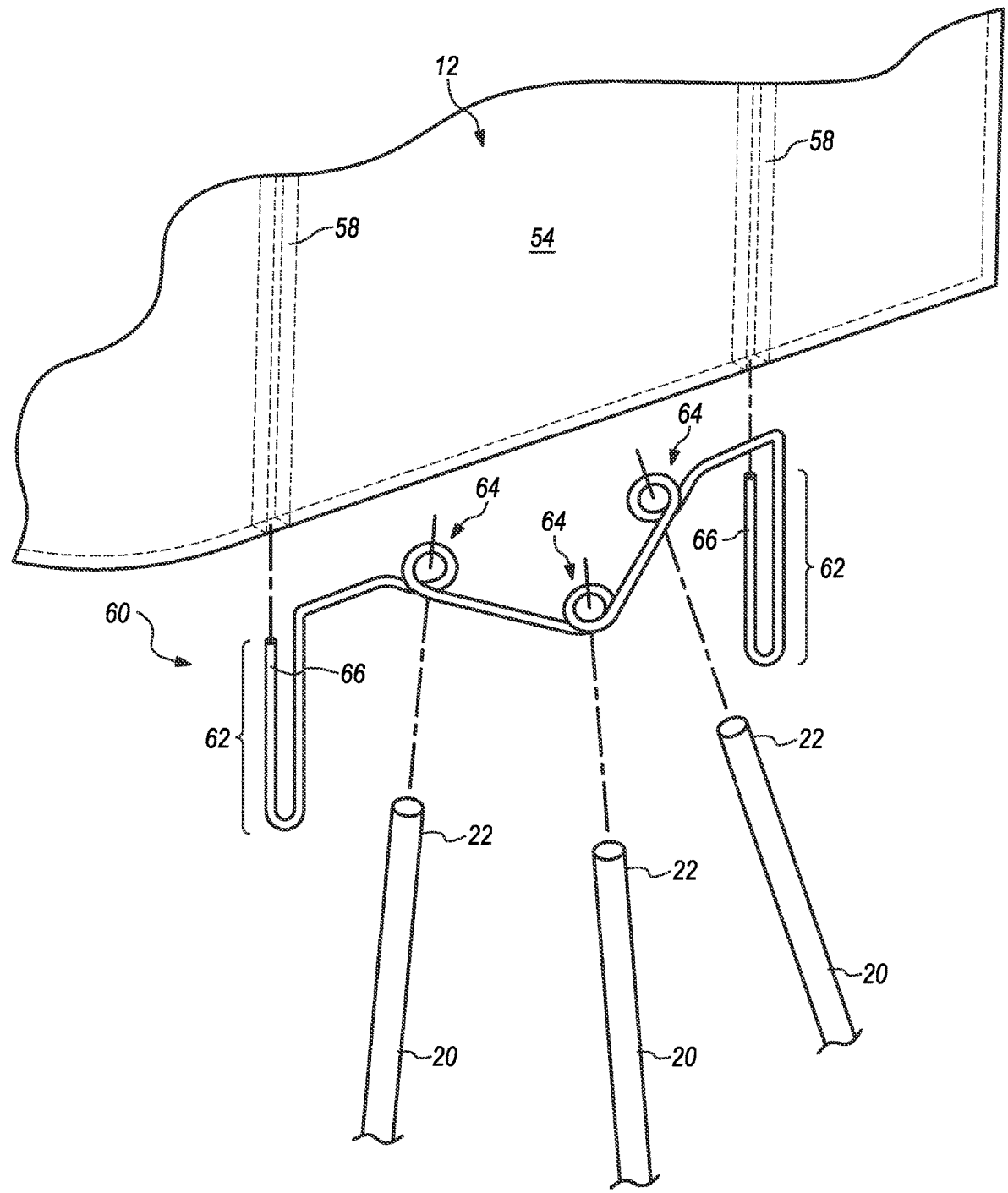
FIG. 9A is an assembly view of a second embodiment of a rigid member in the form of a wire bracket having an integral set of retainer arms and forming rings for securing a set of support legs.

FIG. 9A is an assembly view of a second embodiment of a rigid member in the form of a wire bracket 60 (also referred to as a coupling or fastener) having an integral set of retainer arms 62 and forming loops 64 for securing a set of yard stakes 20. The wire bracket 60 has been formed from a single piece of wire, such as a 9-gauge wire. The wire has been bent using pliers or a dedicated bending tool so that the wire will retain the configuration shown.

Each loop 64 is formed by the wire having at least one 180-degree turn. The loop forms a circumferential seat that can receive and secure the upper end 22 of the yard stake 20. Each retainer arm 62 includes an upwardly-directed hook 66 that may be inserted into a flute 58 of the corrugated plastic sheet sign 12.

Figure 9B:
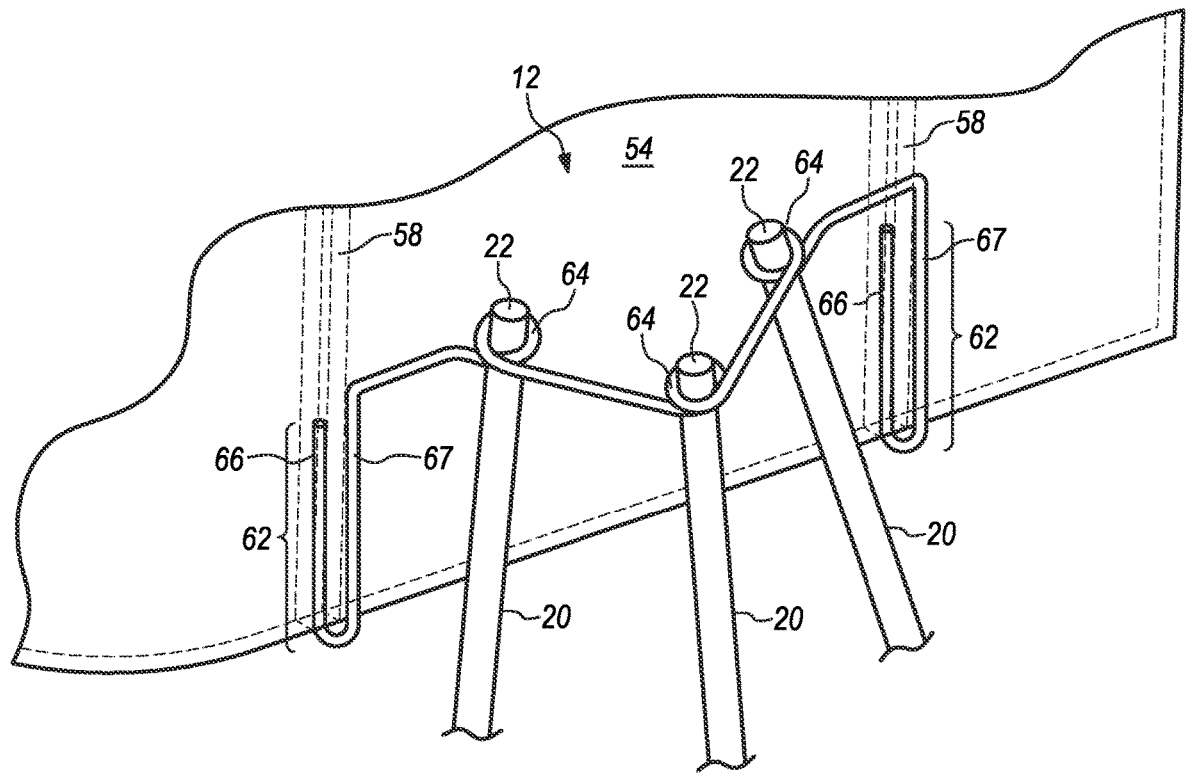
FIG. 9B is a perspective view of the wire bracket securing the set of support legs and the sign.

FIG. 9B is a perspective view of the wire bracket 60 securing the set of yard stakes 20 and the sign 12. The upper end 22 of the yard stakes 20 extend along an axial centerline of the loops 64 and the hooks 66 extend into the flutes 58.

Optionally, the back wall 54 of the corrugated plastic sheet 54 may be gripped by the hook 66 and the back portion 67 of the retainer arm 62.

Figure 10:
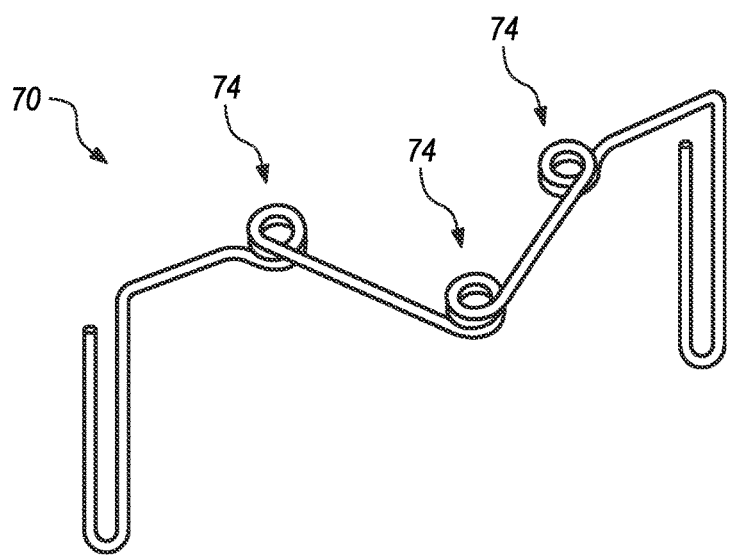
FIG. 10 is a perspective view of an alternative wire bracket having deeper rings.

FIG. 10 is a perspective view of an alternative wire bracket 70 having deeper loops 74. The deeper loops 74 are made by providing multiple turns of the wire around the same axial centerline. Whereas the wire bracket 60 of FIG. 9A has loops 64 with one full turn, the wire bracket 70 of FIG. 10 has loops 74 with two full turns. All other aspects of the wire bracket 70 are the same as the wire bracket 60.

Figure 11A:
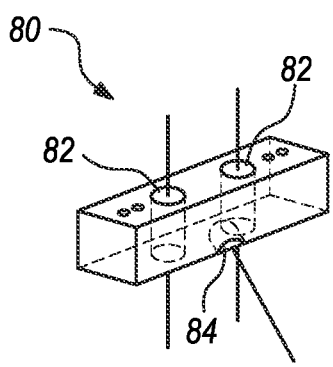
FIGS. 11A-B are perspective views of a rigid block and a wire bracket according to a second embodiment for forming a second-row easel or sign support.
Figure 11B:
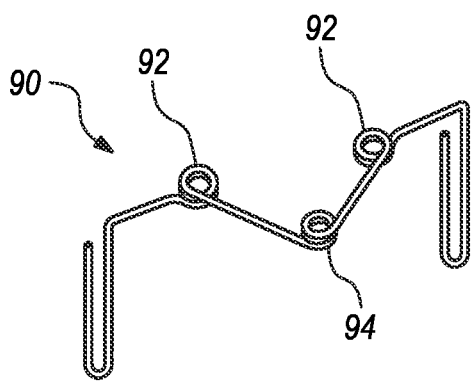

FIGS. 11A-B are perspective views of a rigid block and a wire bracket according to a second embodiment for forming a second-row easel or sign support. The rigid block 80 of FIG. 11A is similar to the rigid block 40 of FIGS. 2, 5A-D, and 6A-7 except that two of the first holes 82 are through holes and have a large enough diameter than the corresponding two yard stakes 20 (see FIG. 2) will slide through the holes 82. However, the remaining first hole 84 may be a blind hole or at least have a sufficiently small diameter as to grip the end of a yard stake. The second holes 44 (see FIG. 2 and other Figures) may be similarly positioned, sized and used as with the rigid block 40.

The wire bracket 90 of FIG. 11B is similar to the wire bracket 70 of FIGS. 9A-10, except that the diameter of the first and third loops 92 has been increased so that the corresponding two yard stakes 20 (see FIG. 9B) will slide through the holes 22. However, the remaining loop 94 may be the same as in wire bracket 70 so as to grip the end of a yard stake. Other aspects of the wire bracket 90 are the same as described for the wire bracket 70.

Figure 11C:
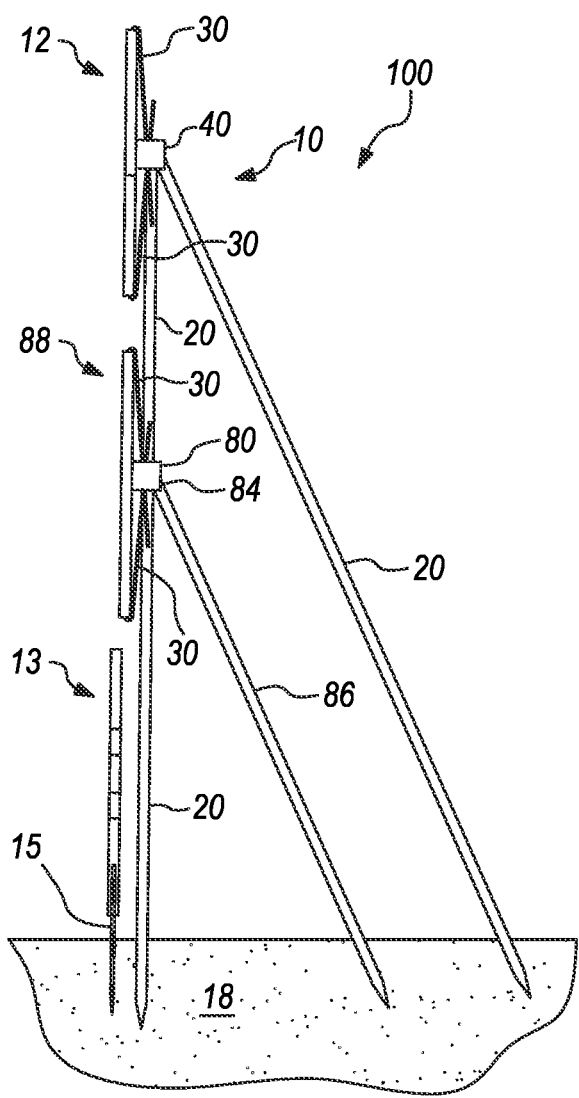
FIGS. 11C-D are side and rear views of a display easel including first and second easels or sign supports.

FIG. 11C is a side view of an apparatus, such as a display easel 100. The display easel 100 may be referred to as a compound display easel because it supports a multiple signs or other display objects. The major portion of the display easel 100 is the same as the display easel 10 of FIGS. 1A-D, 2, 7 and related Figures. The difference in the embodiment shown in FIG. 11C, is the addition of a rigid block 80 (as shown in FIG. 11A), a further yard stake 86, and a set of retainer arms 30 to secure the additional sign or display object 88. The front two yard stakes 20 of the display easel not only support the (upper) rigid block 40, but also guide the (lower) rigid block 80. More specifically, the front two yard stakes 20 are received in the two through holes 82 (see FIG. 11A) of the rigid block 80, such that the rigid block 80 may slide along the front two yard stakes 20. The elevation of the rigid block 80 may be set by the further yard stake 86 that has an upper end secured in the hole 84 of the rigid block 80. In order the support the sign 88, the rigid block 80 may have the same second holes 44 to secure retainer arms 30 as described in FIG. 7 for the (upper) rigid block 40. For effect, a bottom sign 13 is shown independently supported by an H-stake 15 in front of the display easel 100.

Figure 11D:
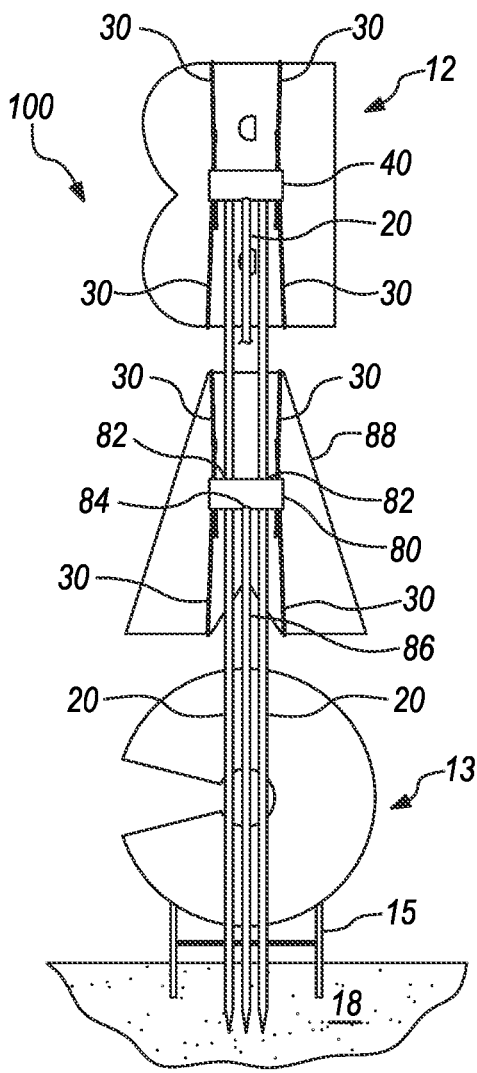

FIG. 11D is a rear view of the display easel 100 of FIG. 11C. In this view it is shown that both the upper rigid block 40 and the lower rigid block 80 may support two to four retainer arms 30. Furthermore, the further yard stake 86 has an upper end secured to the lower rigid block 80 and supports the lower rigid block 80 are a desired elevation depending upon the length of the stake 86 and the extent to which it is pushed into the soil 18. The rearward-extending yard stake 20 extending form the upper rigid block 40 has been truncated in this illustration to avoid obscuring the view of the stake 86 but would actually extend into the soil 18 as shown in FIG. 11C.

Although FIGS. 11C and 11D illustrate the display easel 100 with the rigid block 80, it should be recognized that the wire bracket 90 of FIG. 11B could be substituted for the rigid block 80, since the larger diameter loops 92 will slide about the front yard stakes 20, the remaining loop 94 would secure the yard stake 86, and the retainer arms 62 (see FIG. 9B) would work in the same manner as previously described to support the sign 88.

Display Bar Embodiments

Some embodiments provide an apparatus comprising first and second display bars, each display bar having a rectangular cross-section, each display bar having a plurality of first through holes each having a first diameter for receiving a first tubular support therethrough, and each display bar having a plurality of second through holes each having a second diameter for receiving a fastener. The apparatus may further comprise a first upright tubular support receivable through one of the first through holes in the first display bar for vertically supporting the first display bar; a second upright tubular support receivable through one of the first through holes in the second display bar for vertically supporting the second display bar; and a fastener secured through one of the second through holes in the first display bar and one of the second through holes in the second display bar to secure the first and second display bars together.

In some embodiments, each display bar has a first face, a second face opposite the first face, a first edge extending between the first face and the second face, and a second edge opposite the first edge and extending between the first face and the second face. Each of the through holes may extend through the display bar from the first face to the second face.

In some embodiments, the first display bar includes a channel that extends into the first face of the first display bar adjacent the first edge of the first display bar, and wherein the second display bar includes a channel that extends into the second face of the second display bar adjacent the second edge of the second display bar.

In some embodiments, the first and second display bars each have a plurality of third through holes, each of the third through holes having a third diameter for receiving and frictionally securing a wire retainer arm.

In some embodiments, the first display bar has a first distal end forming a first end rabbet with at least one of the second through holes extending through the first end rabbet, and the second display bar has a second distal end forming a second end rabbet with at least one of the second through holes extending through the second end rabbet. The at least one second through hole in the first end rabbet may align with the at least one second through hole in the second end rabbet when the first and second end rabbets are overlapped to form a rabbet joint. Accordingly, the first and second display bars are connectable to form a display bar assembly with the one or more fasteners secured through the aligned through holes.

In some embodiments, the first and second display bars are identical. Furthermore, the display bar assembly may include the first display bar with the first face of the first display bar upwardly directed and the second display bar with the second face of the second display bar upwardly directed.

In some embodiments, the first and second display bars each include a first channel that extends into the first face adjacent the first edge, a second channel that extends into the first face adjacent the second edge, a third channel that extends into the second face adjacent the first edge, and a fourth channel that extends into the second face adjacent the second edge. The channels are arranged and sized for selective connection with an edge of a panel clip, also known as a Z clip. In one option, the display bar assembly with the first display bar connected to the second display bar aligns the first and second channels of the first display bar with the third and fourth channels of the second display bar.

In some embodiments, the first and second display bars each have a plurality of third through holes, each of the third through holes having a third diameter for receiving and frictionally securing a wire retainer arm. The plurality of third through holes in the first display bar may include multiple third through holes inwardly adjacent the first and third channels and multiple third through holes inwardly adjacent the second and fourth channels. Similarly, the plurality of third through holes in the second display bar may include multiple third through holes inwardly adjacent the first and third channels and multiple third through holes inwardly adjacent the second and fourth channels.

In some embodiments, the apparatus may further comprise a plurality of display objects and a plurality of panel clips. Each panel clip may have a first flat panel secured to one of the display objects and a second flat panel having a downwardly directed edge receivable within an upwardly directed one of the first and/or second channels, wherein the first flat panel is parallel to the second flat panel and offset from the second flat panel. In one option, the first flat panel may be secured to one of the display objects with a hook and loop fastener. For example, a first component of the hook and loop fastener may be attached to a flat surface of the display object and a second component of the hook and loop fastener may be attached to the first flat panel. Accordingly, the display object may be adjustably moved up, down, side-to-side, or to a different angle by releasing the first and second components (halves) of the hook and loop fastener, moving the display object relative to the panel clip, then reattaching the first and second components of the hook and loop fastener. This allows a user to easily make minor adjustments in the position of a single display object without disturbing the position of other display objects.

In some embodiments, the first and second upright tubular supports may be held upright by a stand. In other embodiments, the first and second upright tubular supports are held upright by a spike securable within a bed of dirt.

In some embodiments, the first and second upright tubular supports may be a continuous section of tubing. In other embodiments, the first and second upright tubular supports may include telescopic segments of tubing.

Some embodiments provide a kit comprising first and second display bars, each display bar having a rectangular cross-section, each display bar having a plurality of first through holes each having a first diameter for receiving a first tubular support therethrough, and each display bar having a plurality of second through holes each having a second diameter for receiving a fastener. Furthermore, each display bar may have a first face, a second face opposite the first face, a first edge extending between the first face and the second face, and a second edge opposite the first edge and extending between the first face and the second face. Still further, each of the through holes may extend through the display bar from the first face to the second face.

In some embodiments of the kit, the first and second display bars may each have a plurality of third through holes, each of the third through holes having a third diameter for receiving and frictionally securing a wire retainer arm, wherein the first, second and third diameters each have a different diameter.

In some embodiments of the kit, the first display bar may have a first distal end forming a first end rabbet with at least one of the second through holes extending through the first end rabbet, and the second display bar may have a second distal end forming a second end rabbet with at least one of the second through holes extending through the second end rabbet. Furthermore, the at least one second through hole in the first end rabbet may align with the at least one second through hole in the second end rabbet when the first and second end rabbets are overlapped to form a rabbet joint. Still further, the first and second display bars may be connectable to form a display bar assembly with the one or more fasteners secured through the aligned through holes.

In some embodiments of the kit, the first and second display bars may be identical. In one option, the first and second display bars may each include a first channel that extends into the first face adjacent the first edge, a second channel that extends into the first face adjacent the second edge, a third channel that extends into the second face adjacent the first edge, and a fourth channel that extends into the second face adjacent the second edge.

In some embodiments, the kit may further comprise a first upright tubular support receivable through one of the first through holes in the first display bar for vertically supporting the first display bar, and a second upright tubular support receivable through one of the first through holes in the second display bar for vertically supporting the second display bar. Embodiments of the kit may further comprise any one or more of the components described herein for an apparatus, system, display and the like.

Figure 12A:
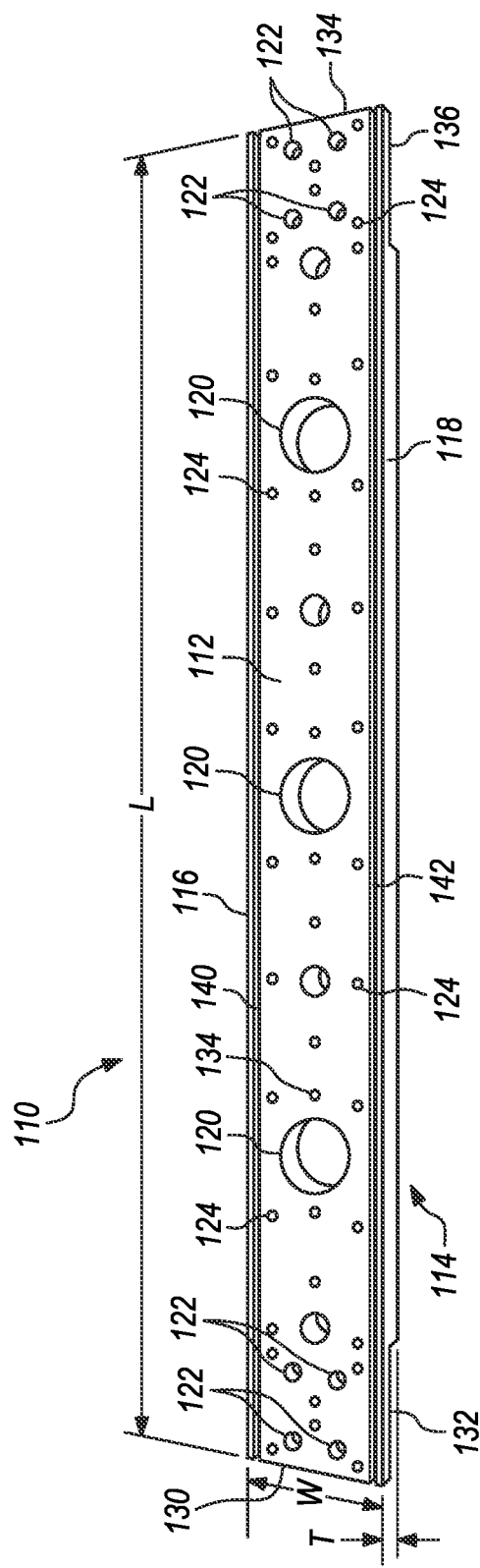
FIGS. 12A-B are top and bottom perspective views of a display bar.
Figure 12B:
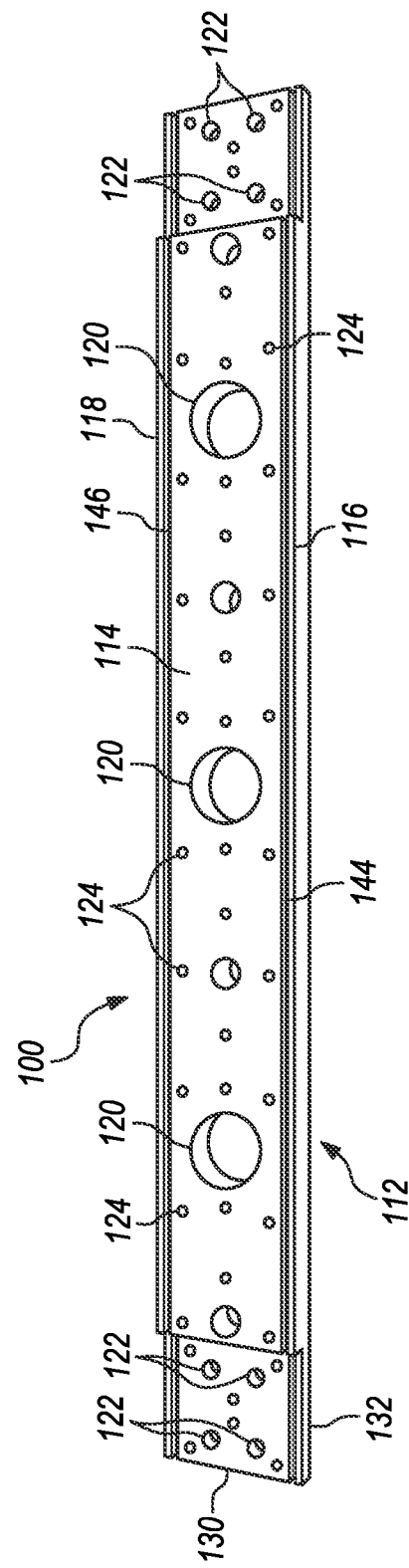

FIGS. 12A-B are top and bottom perspective views of a display bar 110. The display bar has a rectangular cross-section. Furthermore, the display bar 110 has a first face 112, a second face 114 opposite the first face 112, a first edge 116 extending between the first face and the second face, and a second edge 118 opposite the first edge 116 and extending between the first face and the second face.

As shown, the display bar 110 has a plurality of first through holes 120 each having a first diameter for receiving a first tubular support therethrough. The display bar also has a plurality of second through holes 122 each having a second diameter for receiving a fastener. Still further, the display bar has a plurality of third through holes 124 (only a few are labelled), each of the third through holes having a third diameter for receiving and frictionally securing a wire retainer arm 30 (not shown; see FIGS. 2-3). Each of the through holes 120, 122, 124 may extend through the display bar from the first face 112 to the second face 114. As shown, the plurality of third through holes 124 in the first display bar may include multiple third through holes inwardly adjacent the first and third channels 140, 142 and multiple third through holes inwardly adjacent the second and fourth channels 144, 146.

The display bar 110 has a first distal end 130 forming a first end rabbet 132 with at least one of the second through holes 122 extending through the first end rabbet 132. Similarly, the display bar 110 has a second distal end 134 forming a first end rabbet 136 with at least one of the second through holes 122 extending through the first end rabbet 132. The size of the end rabbets 132, 136 are preferably the same and the layout of the second through holes 122 is preferably the same in each of the end rabbets 132, 136.

The dimensions of the display bar 110 may vary widely and without limitation. However, a preferred display bar may have a thickness ("T") between 0.75 and 2 inches, such as about 1 inch thick; a width ("W") between 2 and 4 inches, such as about 2.5 inches wide; and a length ("L") between 2 and 6 feet, between 3-5 feed, or about 4 feet. The display bar 110 has holes with multiple diameters varying from ⅛ inch (third through holes 124) to about ¾ inch (first through holes 120).

The display bar 110 also has channels on both sides of the display bar, such as a ⅛-inch wide channel, to accommodate additional display objects by means of mounting clips, which may be referred to as Z-clips. In FIGS. 12A and 12B, the display bar 110 includes a first channel 140 and a second channel 142 in the first face 112, and a third channel 144 and a fourth channel 146 in the second face 114. The channels preferably have the same dimensions and preferably are positioned the same distance from their closest edge 116, 118.

Figure 13A:
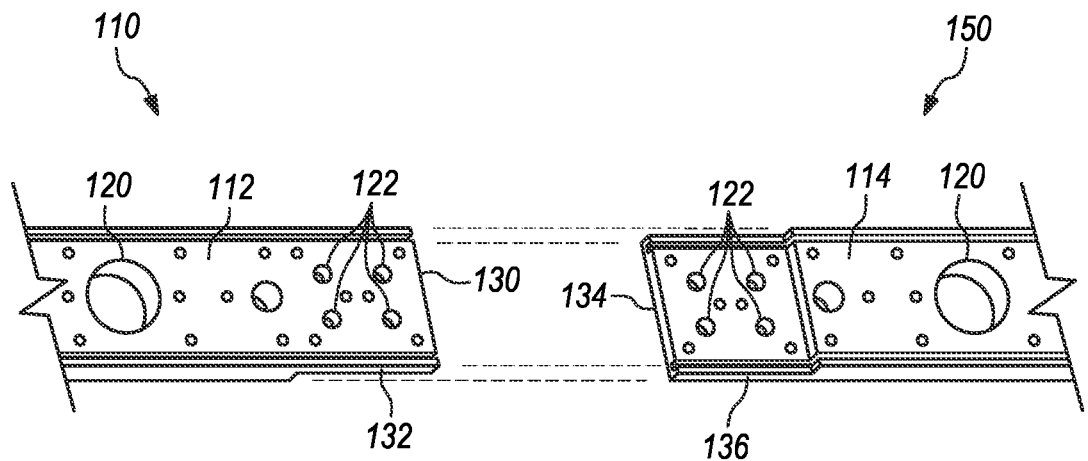
FIGS. 13A-C are diagrams of two display bars linearly aligned, axially aligned for connection with bolts, and connected together for use as a display bar assembly.

FIG. 13A is a diagram of first and second display bars 110, 150 linearly aligned. The second display bar 150 is preferably identical to the first display bar 110. However, the second display bar 150 is oriented 180-degrees from the first display bar 110, either about an axis parallel to the length L or about an axis parallel to the width W. Accordingly, the display bar assembly 160 (see FIG. 13C) may include the first display bar 110 with the first face 112 of the first display bar upwardly directed and the second display bar 150 with the second face 114 of the second display bar upwardly directed.

Figure 13B:
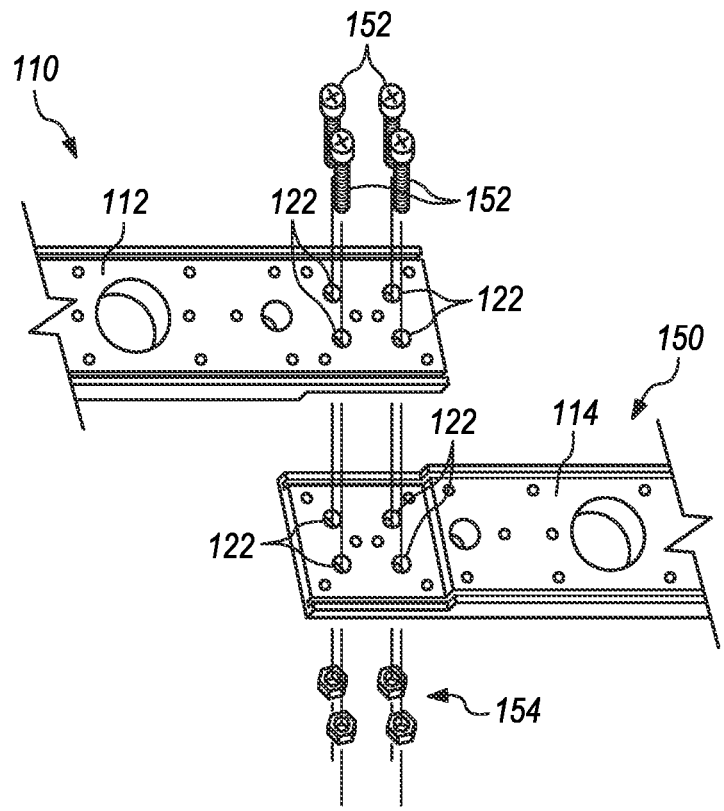

FIG. 13B is a diagram of the first and second display bars 110, 150 with the second through holes 122 of the two display bars aligned for connection with bolts 152 and nuts 154 to form a display bar assembly.

Figure 13C:
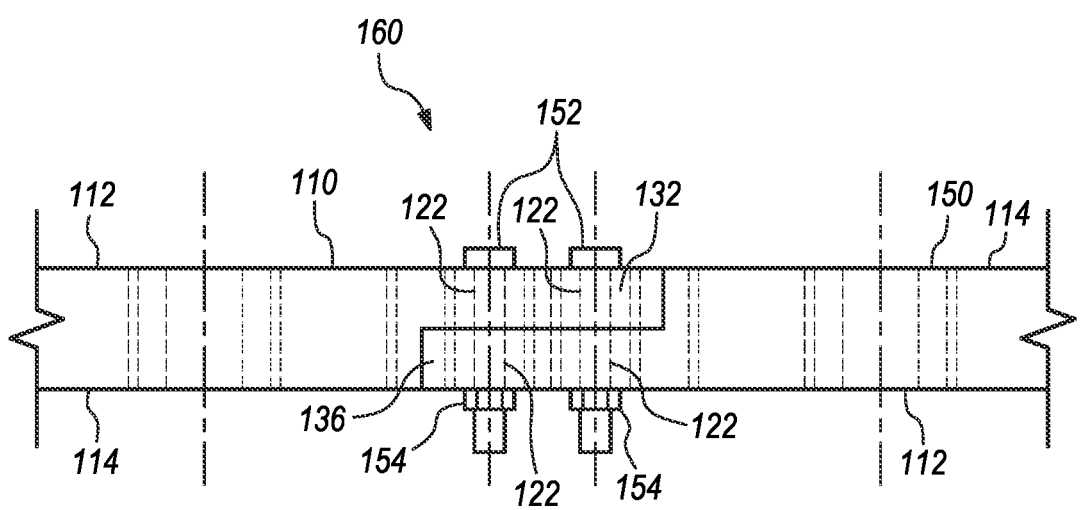

FIG. 13C is a diagram of the first and second display bars 110, 150 connected from end to end to make a longer display bar assembly 160. One preferred fastener is a nut and bolt threaded fastener 152, 154.

The display bar 110 has a first distal end 130 forming a first end rabbet 132 with at least one of the second through holes 122 extending through the first end rabbet 132, and the second display bar has a second distal end forming a second end rabbet 136 with at least one of the second through holes 112 extending through the second end rabbet 136. The at least one second through hole in the first end rabbet may align with the at least one second through hole in the second end rabbet when the first and second end rabbets are overlapped to form a rabbet joint. Accordingly, the first and second display bars 110, 150 are connectable to form the display bar assembly 160 with the one or more fasteners 152, 154 secured through the aligned through holes.

Figure 14:
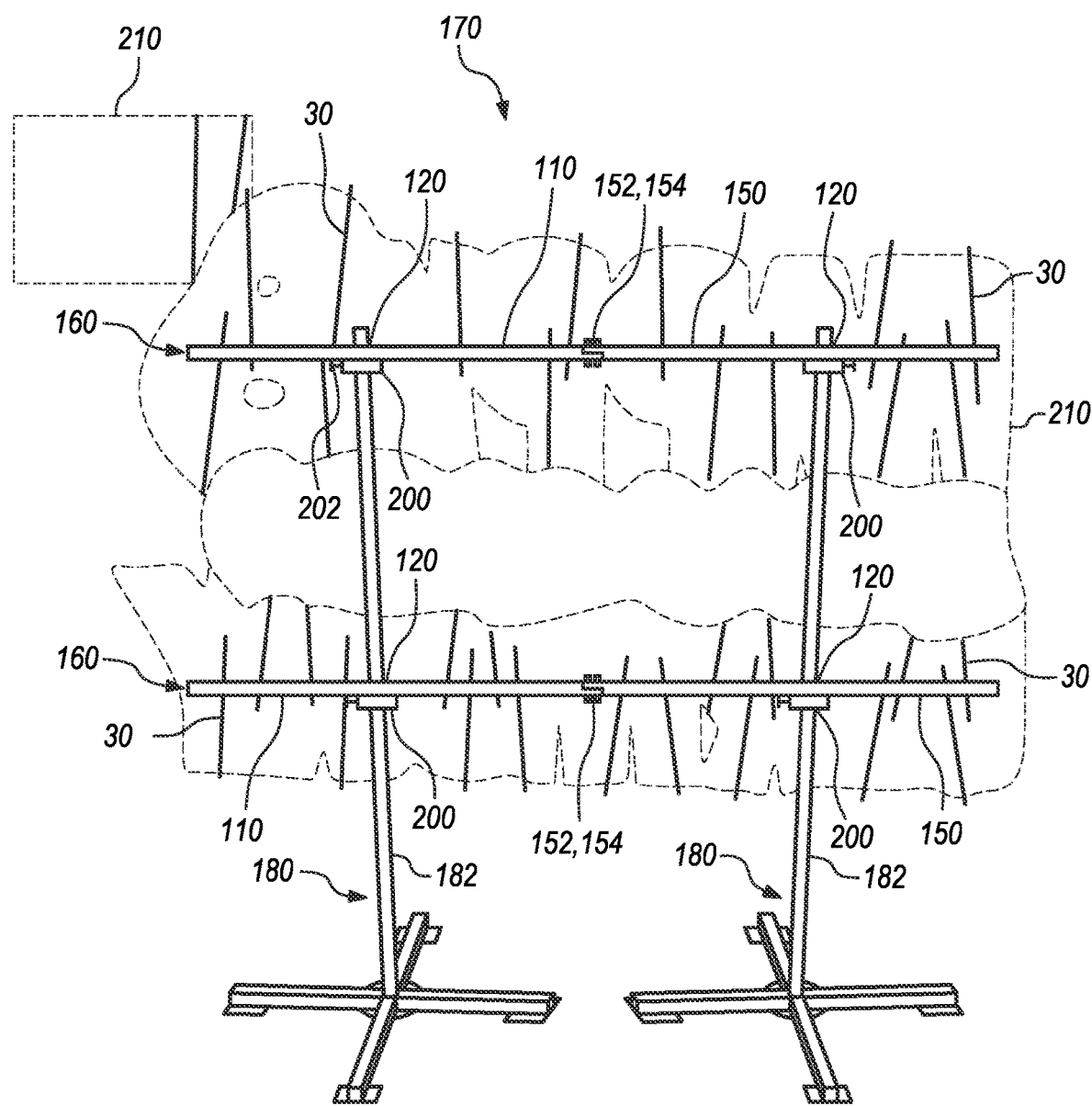
FIG. 14 is a rear view of a sign support assembly including an upper display bar assembly and a lower display bar assembly both secured to two upright tubular stands.

FIG. 14 is a rear view of a sign support assembly 170 including an upper display bar assembly 160 and a lower display bar assembly 160 both secured to two upright tubular stands 180. A first upright tubular support 182 is receivable through one of the first through holes 120 in the first display bar 110 for vertically supporting the first display bar; a second upright tubular support 182 receivable through one of the first through holes 120 in the second display bar 150 for vertically supporting the second display bar; and a fastener 152, 154 secured through one of the second through holes 122 in the first display bar and one of the second through holes 122 in the second display bar to secure the first and second display bars together.

Figure 17:
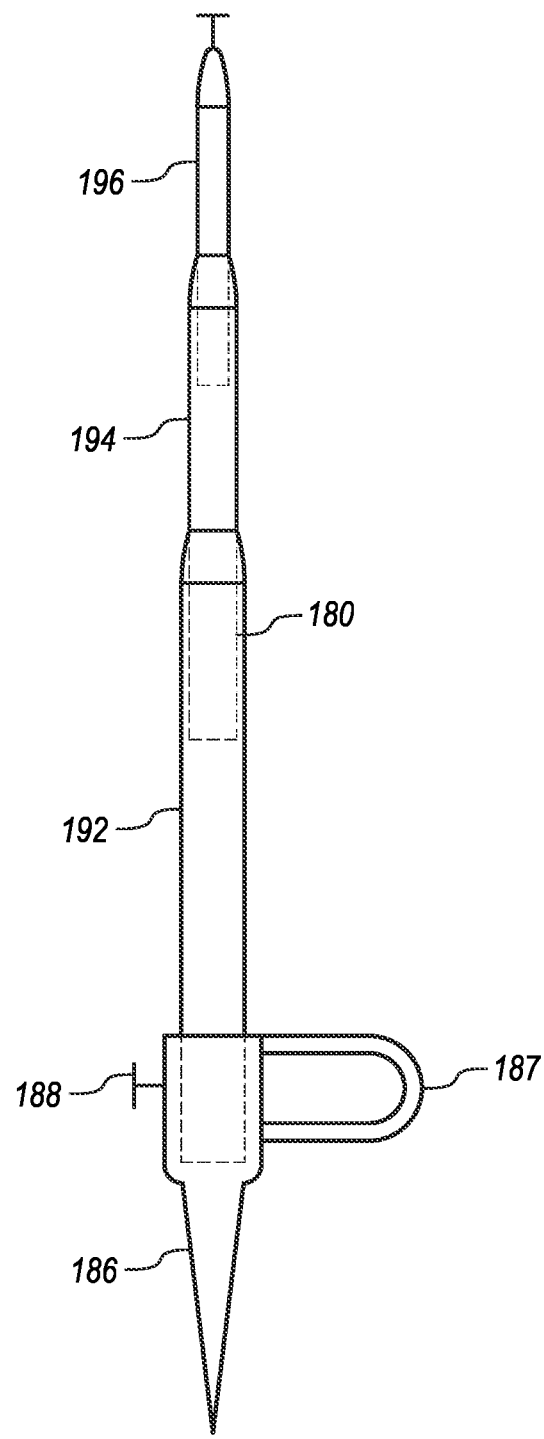
FIG. 17 is a diagram of an upright tubular support having a spike for being secured into the ground.

The first and second upright tubular supports 182 may be held upright by a stand 180, such as including the legs as shown. However, FIG. 17 shows how the first and second upright tubular supports 182 may be held upright by a spike 186 securable within a bed of dirt. FIG. 17 further illustrates a foot bar 187 and a set screw 188. Furthermore, the first and second upright tubular supports 180 are illustrated as being a continuous section of tubing in FIG. 14, but are illustrated as including telescopic segments 192, 194, 196 of tubing in FIG. 17. Rings 200 with set screws 202 may be secured to the tubular supports to support the display bar assemblies 160. The set screws 202 allow an adjustable height for the rings 200 to allow for design flexibility in setting up the sign support assembly 170 to accommodate a desired sign.

The display object or sign 210 (shown in dashed lines) is shown attached to the upper and lower display bar assemblies 160 of the sign support assembly 170 using wire retainers 30. The wire retainers 30 may engage the edges of a sign element, such as flutes of a fluted plastic sheet sign. The engagement between the wire retainers and a display object, as well as the engagement between the wire retainers and the second through holes 120 may be the same as described in reference previous embodiments and drawings.

Figure 15A:
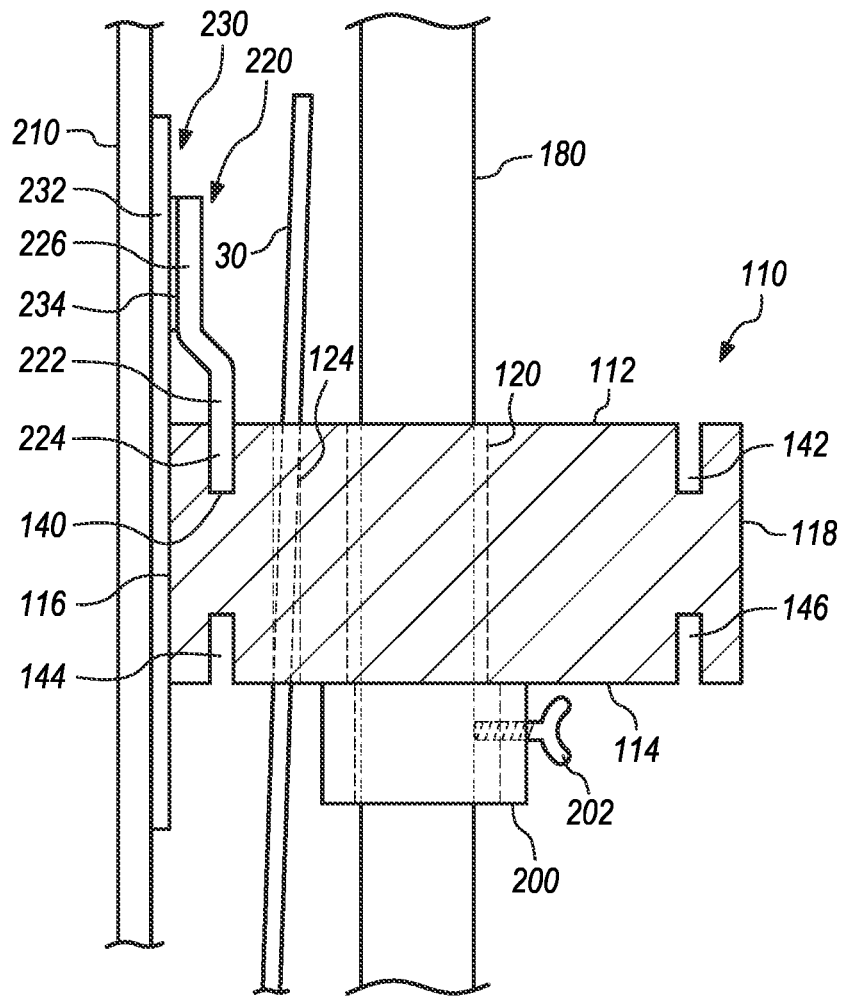
FIGS. 15A-B include a partial cross-sectional side view and a rear view illustrating a Z-clip having a lower edge secured in a display bar channel and an upper face securing a display panel.
Figure 15B:
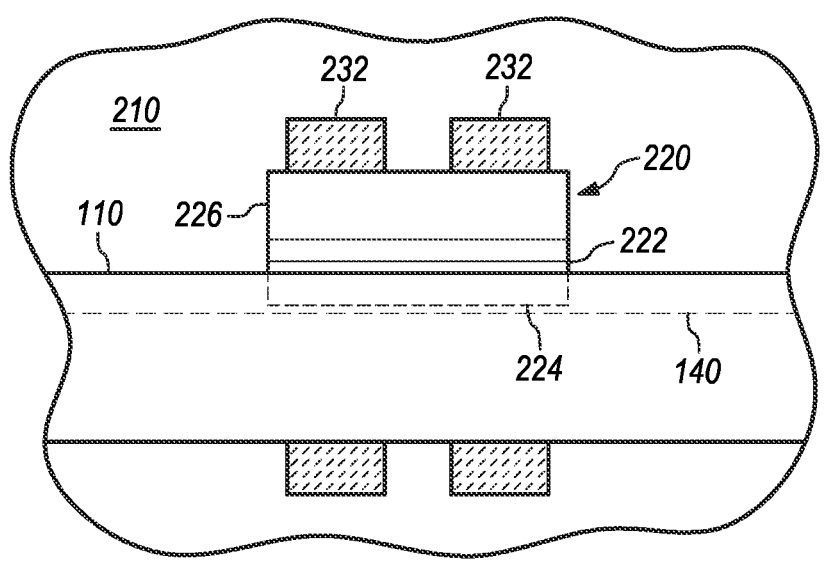

FIGS. 15A-B include a partial cross-sectional side view and a rear view illustrating a panel clip 220 having a first panel 226 securing a display panel 210 and a second panel 222 with lower edge 224 secured in the display bar channel 140.

The first flat panel 226 is parallel to the second flat panel 222 and offset from the second flat panel 222. As shown, the first flat panel 226 is secured to one of the display objects 210 with a hook and loop fastener 230. For example, a first component 232 of the hook and loop fastener may be attached to a flat surface of the display object 210 and a second component 234 of the hook and loop fastener may be attached to the first flat panel 226. Accordingly, the display object 210 may be adjustably moved up, down, side-to-side, or to a different angle by releasing the first and second components (halves) 232, 234 of the hook and loop fastener 230, moving the display object relative to the panel clip, then reattaching the first and second components of the hook and loop fastener. This allows a user to easily make minor adjustments in the position of a single display object without disturbing the position of other display objects. Notice that the display bar 110 could be used in the same manner if it were upside down.

Figure 16:
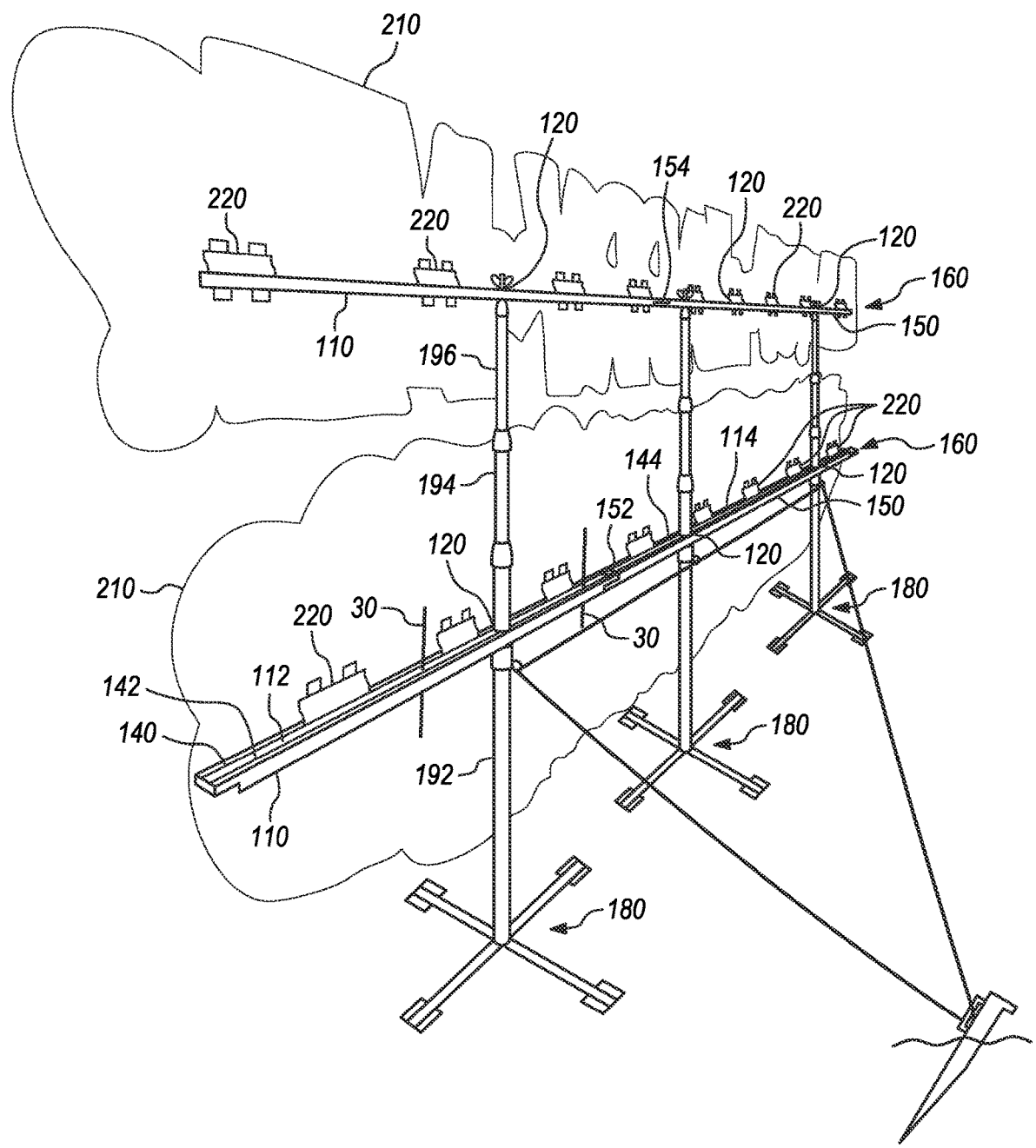
FIG. 16 is a perspective view of upper and lower display bar assemblies supported by three upright tubular stands and with numerous display panels secured to the display bar assemblies using Z-clips.

FIG. 16 is a perspective view of upper and lower display bar assemblies 160 supported by three upright tubular stands 180 and with numerous display panels 210 secured to the display bar assemblies using panel clips 220. The first and second display bars 110, 150 in each display bar assembly 160 include a first channel 140 that extends into the first face 112 adjacent the first edge, a second channel 142 that extends into the first face adjacent the second edge, a third channel 144 that extends into the second face adjacent the first edge, and a fourth channel 146 that extends into the second face adjacent the second edge. The channels are arranged and sized for selective connection with an edge of a panel clip 220, also known as a Z clip. The display bar assembly 160 with the first display bar 110 connected to the second display bar 150 aligns the first and second channels 140, 142 of the first display bar with the third and fourth channels 144, 146 of the second display bar.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus, comprising:
   first and second display bars, each display bar having a rectangular cross-section, each display bar having a plurality of first through holes each having a first diameter for receiving a first tubular support therethrough, and each display bar having a plurality of second through holes each having a second diameter for receiving a fastener;
   a first upright tubular support receivable through one of the first through holes in the first display bar for vertically supporting the first display bar;
   a second upright tubular support receivable through one of the first through holes in the second display bar for vertically supporting the second display bar; and
   a fastener secured through one of the second through holes in the first display bar and one of the second through holes in the second display bar to secure the first and second display bars together.

2. The apparatus of claim 1, wherein each display bar has a first face, a second face opposite the first face, a first edge extending between the first face and the second face, and a second edge opposite the first edge and extending between the first face and the second face, and wherein each of the through holes extend through the display bar from the first face to the second face.

3. The apparatus of claim 2, wherein the first display bar includes a channel that extends into the first face of the first display bar adjacent the first edge of the first display bar, and wherein the second display bar includes a channel that extends into the second face of the second display bar adjacent the second edge of the second display bar.

4. The apparatus of claim 2, wherein the first and second display bars each have a plurality of third through holes, each of the third through holes having a third diameter for receiving and frictionally securing a wire retainer arm.

5. The apparatus of claim 2, wherein the first display bar has a first distal end forming a first end rabbet with at least one of the second through holes extending through the first end rabbet, wherein the second display bar has a second distal end forming a second end rabbet with at least one of the second through holes extending through the second end rabbet, and wherein the at least one second through hole in the first end rabbet aligns with the at least one second through hole in the second end rabbet when the first and second end rabbets are overlapped to form a rabbet joint, and wherein the first and second display bars are connectable to form a display bar assembly with the one or more fasteners secured through the aligned through holes.

6. The apparatus of claim 5, wherein the first and second display bars are identical, and wherein the display bar assembly includes the first display bar with the first face of the first display bar upwardly directed and the second display bar with the second face of the second display bar upwardly directed.

7. The apparatus of claim 6, wherein the first and second display bars each include a first channel that extends into the first face adjacent the first edge, a second channel that extends into the first face adjacent the second edge, a third channel that extends into the second face adjacent the first edge, and a fourth channel that extends into the second face adjacent the second edge.

8. The apparatus of claim 7, wherein the display bar assembly with the first display bar connected to the second display bar aligns the first and second channels of the first display bar with the third and fourth channels of the second display bar.

9. The apparatus of claim 8, wherein the first and second display bars each have a plurality of third through holes, each of the third through holes having a third diameter for receiving and frictionally securing a wire retainer arm, and wherein, for both the first and second display bars, the plurality of third through holes include multiple third through holes inwardly adjacent the first and third channels and multiple third through holes inwardly adjacent the second and fourth channels.

10. The apparatus of claim 8, further comprising:
    a plurality of display objects; and
    a plurality of panel clips, each panel clip having a first flat panel secured to one of the display objects and a second flat panel having a downwardly directed edge receivable within an upwardly directed one of the first and/or second channels, wherein the first flat panel is parallel to the second flat panel and offset from the second flat panel.

11. The apparatus of claim 10, wherein the first flat panel is secured to one of the display objects with a hook and loop fastener, wherein a first component of the hook and loop fastener is attached to a flat surface of the display object and a second component of the hook and loop fastener is attached to the first flat panel.

12. The apparatus of claim 1, wherein the first and second upright tubular supports are held upright by a stand.

13. The apparatus of claim 1, wherein the first and second upright tubular supports are held upright by a spike securable within a bed of dirt.

14. The apparatus of claim 1, wherein the first and second upright tubular supports are a continuous section of tubing.

15. The apparatus of claim 1, wherein the first and second upright tubular supports include telescopic segments of tubing.

16. A kit, comprising:
    first and second display bars, each display bar having a rectangular cross-section, each display bar having a plurality of first through holes each having a first diameter for receiving a first tubular support therethrough, and each display bar having a plurality of second through holes each having a second diameter for receiving a fastener;
    wherein each display bar has a first face, a second face opposite the first face, a first edge extending between the first face and the second face, and a second edge opposite the first edge and extending between the first face and the second face, and wherein each of the through holes extend through the display bar from the first face to the second face; and
    wherein the first display bar has a first distal end forming a first end rabbet with at least one of the second through holes extending through the first end rabbet, wherein the second display bar has a second distal end forming a second end rabbet with at least one of the second through holes extending through the second end rabbet, and wherein the at least one second through hole in the first end rabbet aligns with the at least one second through hole in the second end rabbet when the first and second end rabbets are overlapped to form a rabbet joint, and wherein the first and second display bars are connectable to form a display bar assembly with the one or more fasteners secured through the aligned through holes.

17. The kit of claim 16, wherein the first and second display bars each have a plurality of third through holes, each of the third through holes having a third diameter for receiving and frictionally securing a wire retainer arm, wherein the first, second and third diameters each have a different diameter.

18. The kit of claim 16, wherein the first and second display bars are identical, and wherein the first and second display bars each include a first channel that extends into the first face adjacent the first edge, a second channel that extends into the first face adjacent the second edge, a third channel that extends into the second face adjacent the first edge, and a fourth channel that extends into the second face adjacent the second edge.

19. The kit of claim 18, further comprising:
a first upright tubular support receivable through one of the first through holes in the first display bar for vertically supporting the first display bar; and
a second upright tubular support receivable through one of the first through holes in the second display bar for vertically supporting the second display bar.

\* \* \* \* \*